(12) United States Patent
Saylor

(10) Patent No.: US 9,902,573 B2
(45) Date of Patent: *Feb. 27, 2018

(54) COMPACT DEPALLETIZER INCLUDING A SKELETON AND A SUBASSEMBLY

(71) Applicant: ROI Industries Group, Inc., Durham, NC (US)

(72) Inventor: Kevin M. Saylor, Durham, NC (US)

(73) Assignee: ROI INDUSTRIES GROUP, INC., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,545

(22) Filed: Nov. 8, 2016

(65) Prior Publication Data

US 2017/0190519 A1 Jul. 6, 2017

Related U.S. Application Data

(63) Continuation of application No. 14/985,588, filed on Dec. 31, 2015, now Pat. No. 9,511,957.

(51) Int. Cl.
*B65G 59/02* (2006.01)
(52) U.S. Cl.
CPC ................................ *B65G 59/02* (2013.01)
(58) Field of Classification Search
CPC .......... B65G 59/02; B65G 57/03; B65B 5/08; B65B 5/10
USPC ................ 414/799, 801; 901/16; 74/471 XY
See application file for complete search history.

(56) References Cited

U.S. PATENT DOCUMENTS

| 4,082,194 | A | | 4/1978 | Sheehan |
| 4,242,025 | A | | 12/1980 | Thibault |
| 4,597,707 | A | | 7/1986 | Cornacchia |
| 4,610,592 | A | * | 9/1986 | Pienta .................... B65G 61/00 294/103.2 |
| 4,746,255 | A | | 5/1988 | Roccabianca et al. |
| 4,836,111 | A | * | 6/1989 | Kaufmann ............... B23Q 1/26 104/247 |
| 4,850,782 | A | | 7/1989 | Focke |
| 5,100,284 | A | | 3/1992 | Boisseau |
| 5,768,845 | A | | 6/1998 | Beaulieu et al. |

(Continued)

FOREIGN PATENT DOCUMENTS

JP 60-189413 * 9/1985

OTHER PUBLICATIONS

EOL Systems, UCPM Ultra Compact Palletizer Module from End of Line Systems, www.eolsystems.com; Dec. 23, 2015. 1 page.

(Continued)

*Primary Examiner* — Anna M Momper
*Assistant Examiner* — Lynn E Schwenning
(74) *Attorney, Agent, or Firm* — NEO IP

(57) ABSTRACT

A compact depalletizer including a skeleton and a subassembly. Components of the skeleton are constructed of aluminum, which provides advantages over the prior art in terms of strength, rigidity, weight, and cost. The aluminum may be pretensioned or prestressed to provide these advantages. The subassembly is preferably mounted to the side of the skeleton. The compact depalletizer is readily portable, and robotic elements of the compact depalletizer do not need to be reprogrammed after transport, so installation time is substantially reduced compared with prior art depalletizers.

17 Claims, 31 Drawing Sheets

(56) References Cited

U.S. PATENT DOCUMENTS

| | | | |
|---|---|---|---|
| 6,718,229 B1 | 4/2004 | Takebayashi et al. | |
| 6,923,085 B2 | 8/2005 | Nakano | |
| 6,987,241 B2* | 1/2006 | Hacker | B23Q 11/0825 |
| | | | 160/222 |
| 7,993,095 B2 | 8/2011 | Reichler | |
| 8,371,797 B2 | 2/2013 | Bonhomme | |
| 8,539,739 B2 | 9/2013 | Pierson et al. | |
| 8,607,528 B2 | 12/2013 | Ellen | |
| 9,511,957 B1* | 12/2016 | Saylor | B65G 57/03 |
| 2002/0064447 A1 | 5/2002 | Gurevich et al. | |
| 2005/0265817 A1 | 12/2005 | Blanc | |
| 2010/0023159 A1 | 1/2010 | Mueller | |
| 2010/0310349 A1* | 12/2010 | Bonhomme | B65G 57/00 |
| | | | 414/788.1 |
| 2012/0213625 A1 | 8/2012 | Roberts | |
| 2012/0282066 A1* | 11/2012 | Naumann | B21D 43/05 |
| | | | 414/226.05 |
| 2014/0053668 A1 | 2/2014 | Shan et al. | |
| 2014/0294553 A1 | 10/2014 | Petrovic | |

OTHER PUBLICATIONS

Euroimpianti Skilled 101 Palletizing Robot Brochure, www.skilledrobots.com, Euroimpianti S.p.a., Via Lago di Vico, 30, 36015 Schio—Vicenza IT; 5 pages.

Izzo, Anthoney, "How to Determine Safe Stacking Heights", Jan. 16, 2014, Compliance & Risk Management.

JZW Control Systems, MiniPal Palletizer, MiniPal Compact Palletizer Brochure, PO Box 322, Dee Why NSW 2099 Australia, www.jzw.com.au. 2 pages.

* cited by examiner

COMPACT DEPALLETIZER INCLUDING A SKELETON AND A SUBASSEMBLY

CROSS-REFERENCE TO RELATED APPLICATIONS

This Application relates to and claims priority from the following U.S. Pat. Applications: this application is a continuation of U.S. patent application Ser. No. 14/985,588, filed on Dec. 31, 2015, which is hereby incorporated by reference in its entirety.

BACKGROUND OF THE INVENTION

1. Field of the Invention

The present invention relates to a compact depalletizer and the components thereof. The depalletizer includes a skeleton and a subassembly. The present invention utilizes materials and configurations which provide for advantages over the prior art in terms of cost, size, weight, portability, speed, and control.

2. Description of the Prior Art

Generally, palletizers are known in the prior art. Examples of relevant prior art documents include the following:

U.S. Pat. No. 6,718,229 for "Linear actuator palletizing system and method" by Takebayashi, filed Nov. 3, 2000, describes a method for programming a multi-axis actuator system to perform palletizing uses an intuitive user interface having a data entry screen for palletizing data, which requires only a simple setting of minimal parameters including the number of rows and columns in a pallet and the pitch spacing between pallet positions. Actuator positions necessary for palletizing movements are calculated in real time by an algorithm executed in a digital signal processor of the actuator controllers. Palletizing data entries are stored in a motion profile table in a range of consecutively paired indexes which is separated from the index range dedicated to regular single-step or torque moves.

U.S. Pat. No. 4,597,707 for "Automatic operating palletizer" by Cornacchia, filed Aug. 17, 1984, describes an automatically operating palletizer which includes a vertical support column, a horizontally positioned support beam, and means for movably mounting the horizontal support beam on the support column for vertical movement relative to the support column. A horizontally extending product beam is movably mounted on the horizontal support beam and extends perpendicularly thereto. A product carrier is slidably mounted on the product support beam for movement along its length. Drive means are provided to drive the horizontal support beam and the product support beam to a plurality of vertical and horizontal positions relative to the support column, and also to drive the product carrier along the support beam. As a result the product carrier is positioned at any of a plurality of predetermined positions in a three dimensional volume to move products from one position, e.g. a pickup station, to any of a plurality of other predetermined positions. The support column and various beams of the palletizer are formed of light weight stainless steel.

U.S. Pat. No. 8,539,739 for "Method of palletizing items" by Pierson, filed Jul. 16, 2012, describes compact palletizers that include a stretch-wrap operation as the pallet is built. A four-sided compaction mechanism compresses the rough-built load to the final pallet size and then the entire layer is released to the pallet. Individual items or group of items are picked and placed onto a layer support device in a loose orientation. The loose orientation enables a much faster palletizing operation because the robotic arm that pick-and-places the item, the items, or the row of items, can travel much faster as it does not have to precisely locate the item, items, or row of items. During the time that a layer is being loosely constructed on the layer support device concurrent wrapping can occur.

U.S. Pat. Application Publication No. 2012/0213625 for "Robotic Palletizer Cell And Method Of Construction" by Roberts, filed Feb. 20, 2012, describes a method of constructing a palletizer cell by providing square platform bases which are assembled into an array in abutment with each other, each platform base mounting a respective component of palletizing equipment, such as a robot, one or more conveyors, a slip sheet bin, a discharge module, etc. with one platform base anchored to the factory floor and the rest attached to one or another of the platform bases to form the array of platform bases thereby properly locating the various equipment with each other by the fitting together of the platform bases. Safety fencing sections are mounted atop one or more outer sides to substantially enclose the space within the palletizer cell. Each platform base is formed with side openings which may be engaged with the tines of a fork lift.

U.S. Pat. No. 8,371,797 for "Secured palletization facility" by Bonhomme, filed Sep. 25, 2008, describes a facility including a robot (2) for supplying pallet preparation stations with products (3) of the crate type or different. The structure of the facility includes side walls (11) and doors (13, 14) for accessing the palletization stations A and B. The structure further includes a fixed wall (15) separating stations A and B, and a cowling (20) mobile from one station to the other and in the shape of a dihedron, for alternatively converting each palletization station A and B into a kind of pallet hatch, wherein said conversion is carried out automatically before the opening of the door for accessing a loaded pallet located in said hatch. The cowling (20) is directly actuated by the product handling robot (2).

U.S. Pat. No. 4,082,194 for "Self-contained pallet-elevating bag palletizer" by Sheehan, filed Jun. 30, 1976, describes a wheel-supported palletizer frame structure that has an empty-pallet magazine containing an empty pallet stack from the bottom of which empty pallets are delivered one by one to a hydraulic scissors pallet elevator while the rearward ends of the pallets remaining in the stack are temporarily lifted. The pallet elevator has a table which is raised and then lowered step-by-step by a hydraulic scissors mechanism from successive elevated positions wherein the platform or each tier of bags thereon is lowered in timed relationship with a rotary and reciprocable open-ended bag positioner. Filled bags are fed one-by-one to either of the opposite ends of the bag positioner from a horizontal bag conveyor aligned with the bottom of the bag positioner and coupled thereto for travel back and forth therewith. The bag positioner is rotatable between either of two longitudinal positions aligned with the conveyor and movable into any one of a plurality of lateral positions disposed transverse to said bag conveyor. The bag positioner is also movable laterally of the bag conveyor to position the bags dropped therefrom onto different longitudinal positions parallel to the bag conveyor. The bag positioner is also mounted for motion transverse to the direction of motion of the bag conveyor to deposit the bags in different lateral positions perpendicular to the bag conveyor. The open-ended bag positioner enables individual bags to be swung horizontally to positions 90° and 270° apart in order to position the sewed end of each bag on the inside of each tier of the stack of bags on the pallet. The four-wheeled mount of the entire machine enables it to be moved bodily to any desired position upon the floor of the warehouse or other palletizing building.

U.S. Pat. No. 7,993,095 for "Mobile split palletizer" by Reichler, filed Oct. 30, 2010, describes a modular split palletizer for loading layers of articles on stackable pallets. The palletizer has a frame supporting first, second, and third sections. The first section includes a layer build area and a first portion of a stacker transfer track. The second section includes a tier sheet bin, a top frame bin, and a second portion of the track. The third section includes a pallet build area and a third portion of the track. Each of the first, second, and third sections can be disassembled, moved individually and independently, and re-assembled at a new location to form the complete palletizer. Also disclosed is a method of relocating the modular split palletizer. With the palletizer at one location, the utilities connected to the palletizer are disconnected, the fasteners holding the sections together are released, and the sections are separated. The disassembled sections are moved to the new location and reassembled.

None of the prior art references discloses the compact palletizer of the present invention, specifically a compact palletizer with features such as a cantilevered x-axis, a pre-tensioned double x-axis structure, a 4-rail x-axis system, modular x, z, y, and theta subassemblies, modular design, wheels for mobility, forklift access, unibody frame construction wherein the x-axis structure is also part of the skeleton, integrated safety panels, compact height, a non-welded frame, an assembly that is not top mounted, and an extruded aluminum profile frame.

SUMMARY OF THE INVENTION

The present invention relates to a compact palletizer and the components thereof. The palletizer includes a skeleton and a subassembly. The present invention utilizes materials and configurations which provide for advantages over the prior art in terms of cost, size, weight, portability, speed, and control. Specifically, an extruded aluminum profile frame as utilized in a compact palletizer of the present invention is advantageous over the construction of palletizers of the prior art. The present invention also provides for a pre-tensioned, 4-rail x-axis system as well as a compact palletizer which can be moved without requiring reassembly for operation.

One embodiment of the present invention is a compact palletizer including a skeleton including a base, a frame, and an x-axis structure and an assembly including an x-axis subassembly, a z-axis subassembly, and a y-axis subassembly, wherein the frame includes a multiplicity of vertical posts and a multiplicity of horizontal bars, wherein the x-axis structure includes two horizontal support beams rigidly fixed between two vertical end plates, wherein the x-axis subassembly is affixed to the x-axis structure, and the x-axis subassembly provides an interface for mounting at least two z-axis mounts of the z-axis subassembly to the x-axis subassembly, wherein the at least two z-axis mounts provide for horizontal movement of the z-axis subassembly, wherein the z-axis subassembly includes a chassis subassembly and a spine having a top end and a bottom end, wherein the chassis subassembly is operable to move vertically along the spine and wherein the y-axis subassembly is attached to the z-axis subassembly via the chassis, wherein the y-axis subassembly includes an arm including an end of arm tooling (EOAT) subassembly for moving at least one object, wherein neither the y-axis subassembly, the z-axis subassembly, nor the x-axis subassembly are mounted from the top of the compact palletizer or from the multiplicity of horizontal bars, and wherein the frame, the x-axis structure, and the assembly do not include welded components.

Another embodiment of the present invention is a compact palletizer including a skeleton including a steel base, a frame, and an x-axis structure, and an assembly including an x-axis subassembly, a z-axis subassembly, a y-axis subassembly, and a theta-axis subassembly, wherein the frame includes a multiplicity of vertical extruded aluminum profile posts, wherein the x-axis structure includes two horizontal extruded aluminum profile support beams rigidly fixed between two vertical aluminum end plates, and two aluminum v-guide rail mounts parallel to the two horizontal support beams, wherein the x-axis subassembly includes the four v-guide rails, wherein the four v-guide rails are affixed to the two aluminum v-guide rail mounts such that the four v-guide rails provide an interface for mounting at least two z-axis mounts to the x-axis subassembly via at least two aluminum z-axis mounts, wherein the at least two aluminum z-axis mounts provide for horizontal movement of the z-axis subassembly via the four v-guide rails, wherein the z-axis subassembly includes a spine having a top end and a bottom end, wherein the spine includes two structural extruded aluminum profile components, wherein the bottom end includes an attachment point for an idle sprocket, wherein the top end includes an attachment point for mounting a motor, a gear reducer, and a drive sprocket, wherein the z-axis subassembly further includes a chassis subassembly including a multiplicity of bearing blocks attached to a chassis, wherein the chassis subassembly is operable to move vertically along the spine, wherein the y-axis subassembly is attached to the z-axis subassembly via the chassis, wherein the y-axis subassembly includes an arm comprised of two spaced apart structural extruded aluminum profile arm components, wherein the two spaced apart structural extruded aluminum profile arm components are spaced apart to allow for insertion of a timing belt, wherein two linear rails are mounted to the top of the two spaced apart structural extruded aluminum profile arm components so that they are parallel to the two spaced apart structural extruded aluminum profile arm components, wherein the y-axis subassembly further includes four bearing blocks for mounting the theta-axis subassembly, and wherein the theta-axis subassembly includes an end of arm tooling (EOAT) subassembly for moving at least one object, a motor, and a precision rotary bearing subassembly.

Yet another embodiment of the present invention is a compact palletizer including a skeleton including a steel base and a frame, and an assembly, wherein the frame includes a multiplicity of vertical extruded aluminum profile posts and a multiplicity of horizontal extruded aluminum profile bars and wherein the assembly includes an arm with an end of arm tooling (EOAT) subassembly for moving at least one object.

Another embodiment of the present invention is a compact palletizer including a skeleton including a steel base and a frame, and an assembly including an arm with an end of arm tooling (EOAT) subassembly for moving at least one object, wherein the compact palletizer does not measure more than about 3.35 meters in height when assembled, and wherein a stack height of the compact palletizer is at least about 2.57 meters.

These and other aspects of the present invention will become apparent to those skilled in the art after a reading of the following description of the preferred embodiment when considered with the drawings, as they support the claimed invention.

DETAILED DESCRIPTION

Figure 1:
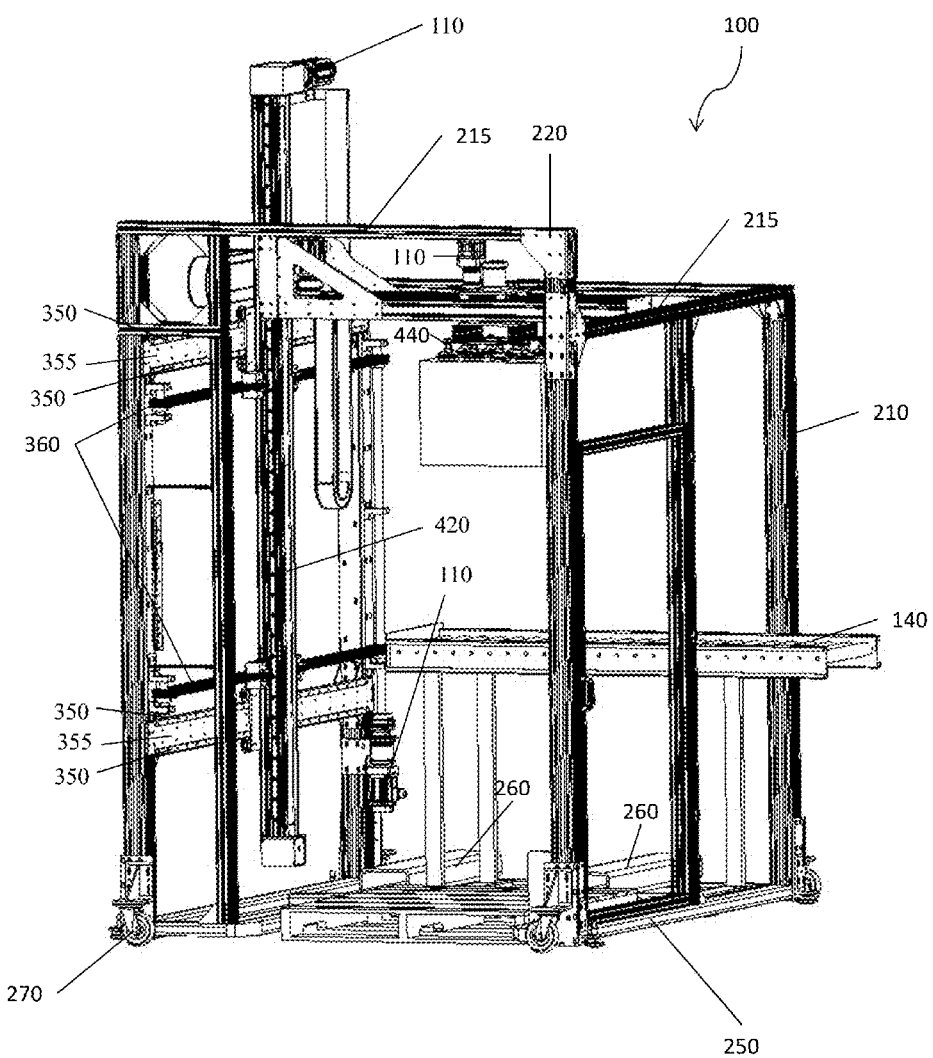
FIG. 1 illustrates a perspective front view of a palletizer with no panels according to the present invention.

Referring now to the drawings in general, the illustrations are for the purpose of describing a preferred embodiment of the invention and are not intended to limit the invention thereto.

The present invention provides a compact palletizer including a skeleton and a subassembly. In one embodiment, the skeleton includes a base, a frame, and an x-axis structure. Preferably, the base is constructed of steel. Preferably, the frame and/or the x-axis structure is constructed of extruded aluminum profile. In another embodiment, some of the components of the base, frame, and/or the x-axis structure are constructed of aluminum. Preferably, vertical posts of the frame and the x-axis structure are constructed of extruded aluminum profile. In one embodiment, the compact palletizer does not include any panels.

In one embodiment, the x-axis structure includes two horizontal support beams (top horizontal support and bottom horizontal support) rigidly fixed between two vertical end plates, and two plates parallel to the two horizontal support beams serving as v-guide rail mounts. Preferably, the two vertical end plates are two precision cut aluminum plates. The two vertical end plates set the spacing between the two horizontal support beams and to insure parallel assembly of these components. Preferably, the two horizontal support beams are constructed out of extruded aluminum profile. The two vertical end plates are preferably perpendicularly affixed to the two horizontal support beams. Preferably, the two horizontal support beams are rigidly fixed between two vertical end plates using bolts and are not welded. Preferably, the x-axis structure does not flex. Preferably, the two plates parallel to the two horizontal support beams serving as v-guide rail mounts are rigidly affixed to the two vertical end plates using bolts and are not welded.

FIG. 1 illustrates a perspective front view of a palletizer with no panels according to the present invention, showing the compact palletizer 100 having motors 110, a conveyer 140, vertical posts of the frame 210, horizontal bars of the frame 215, corner braces 220, a steel base 250, forklift pockets 260, wheels 270, v-rails 350, plates for mounting v-rails 355, timing belts 360, a spine 420, and an end of arm tooling (EOAT) assembly 440.

Figure 2:
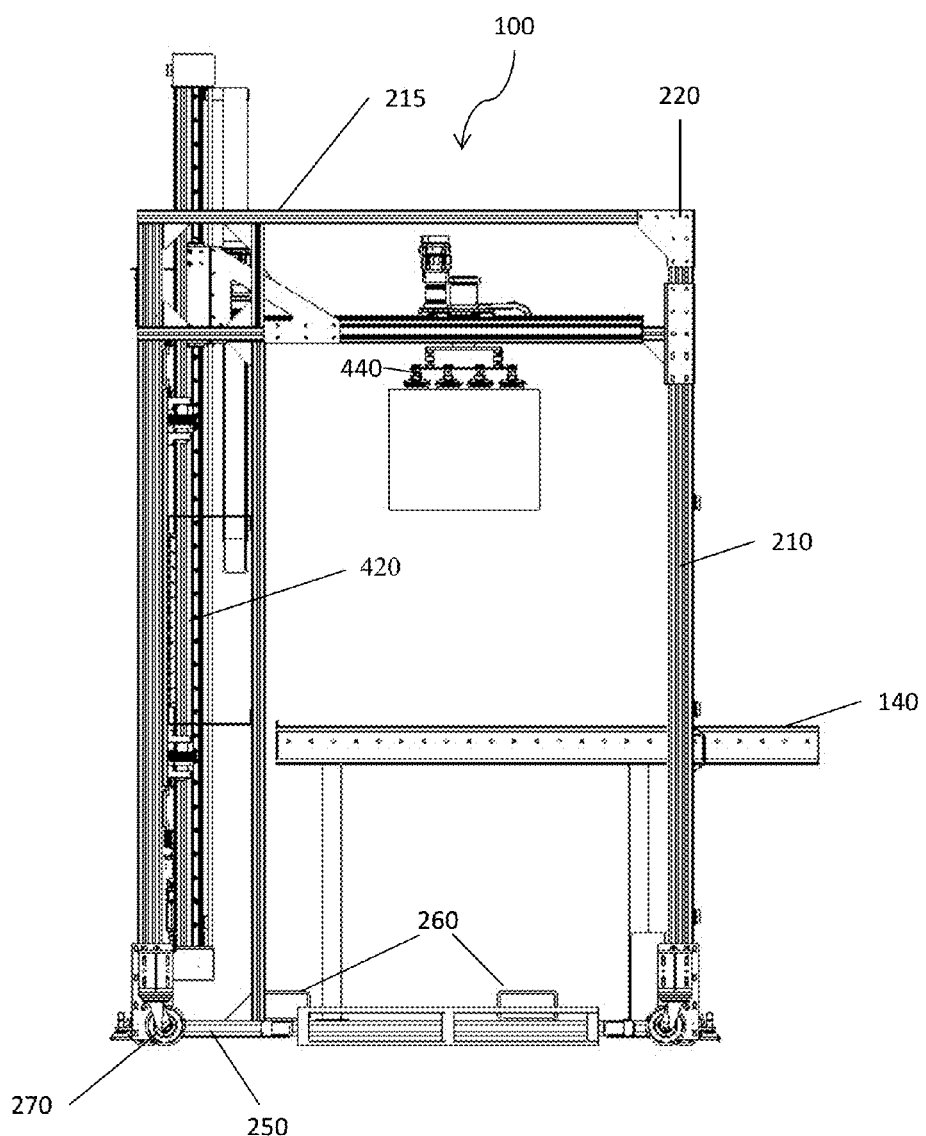
FIG. 2 illustrates a front view of a palletizer according to the present invention.

FIG. 2 illustrates a front view of a palletizer according to the present invention, showing the compact palletizer 100 having a conveyer 140, vertical posts of the frame 210, horizontal bars of the frame 215, corner braces 220, a steel base 250, forklift pockets 260, wheels 270, a spine 420, and an end of arm tooling (EOAT) assembly 440.

Figure 3:
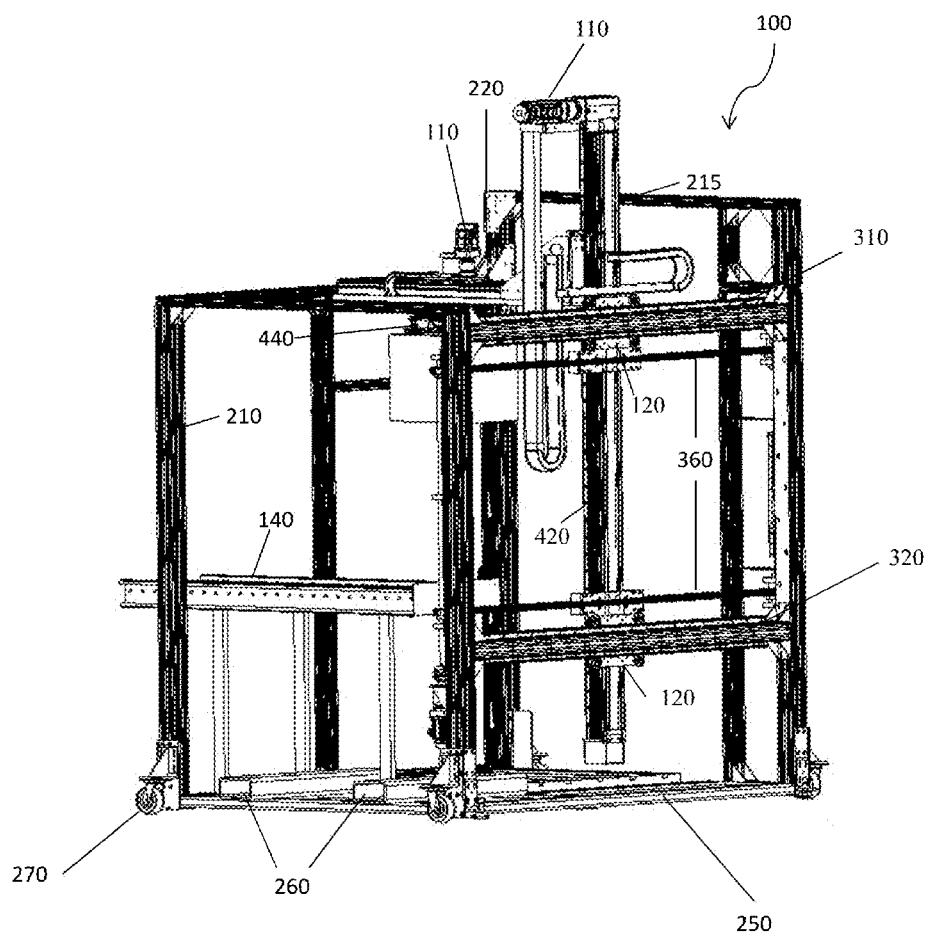
FIG. 3 illustrates a perspective rear view of a palletizer with no panels according to the present invention.

FIG. 3 illustrates a perspective rear view of a palletizer with no panels according to the present invention, showing the compact palletizer 100 having motors 110, z-axis mounting extruded aluminum profile components, a conveyer 140, vertical posts of the frame 210, horizontal bars of the frame 215, corner braces 220, a steel base 250, forklift pockets 260, wheels 270, a top horizontal support beam 310, a bottom horizontal support beam 320, a spine 420, and an end of arm tooling (EOAT) assembly 440.

Figure 4:
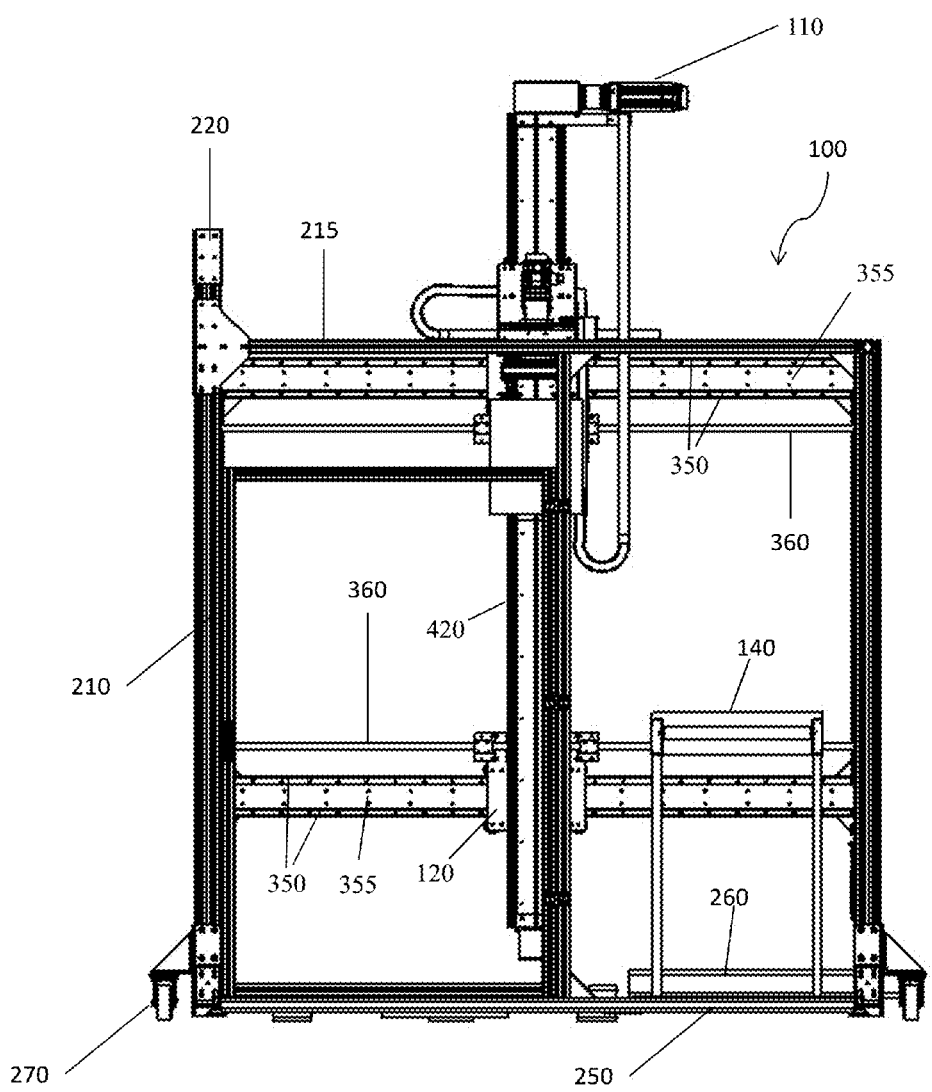
FIG. 4 illustrates a side view of a palletizer according to the present invention.

FIG. 4 illustrates a side view of a palletizer according to the present invention, showing the compact palletizer 100 having a motor 110, v-roller mount and belt tensioner 120, a conveyer 140, vertical posts of the frame 210, horizontal bars of the frame 215, corner braces 220, a steel base 250, forklift pockets 260, wheels 270, v-rails 350, plates for mounting v-rails 355, timing belts 360, and a spine 420.

Figure 5:
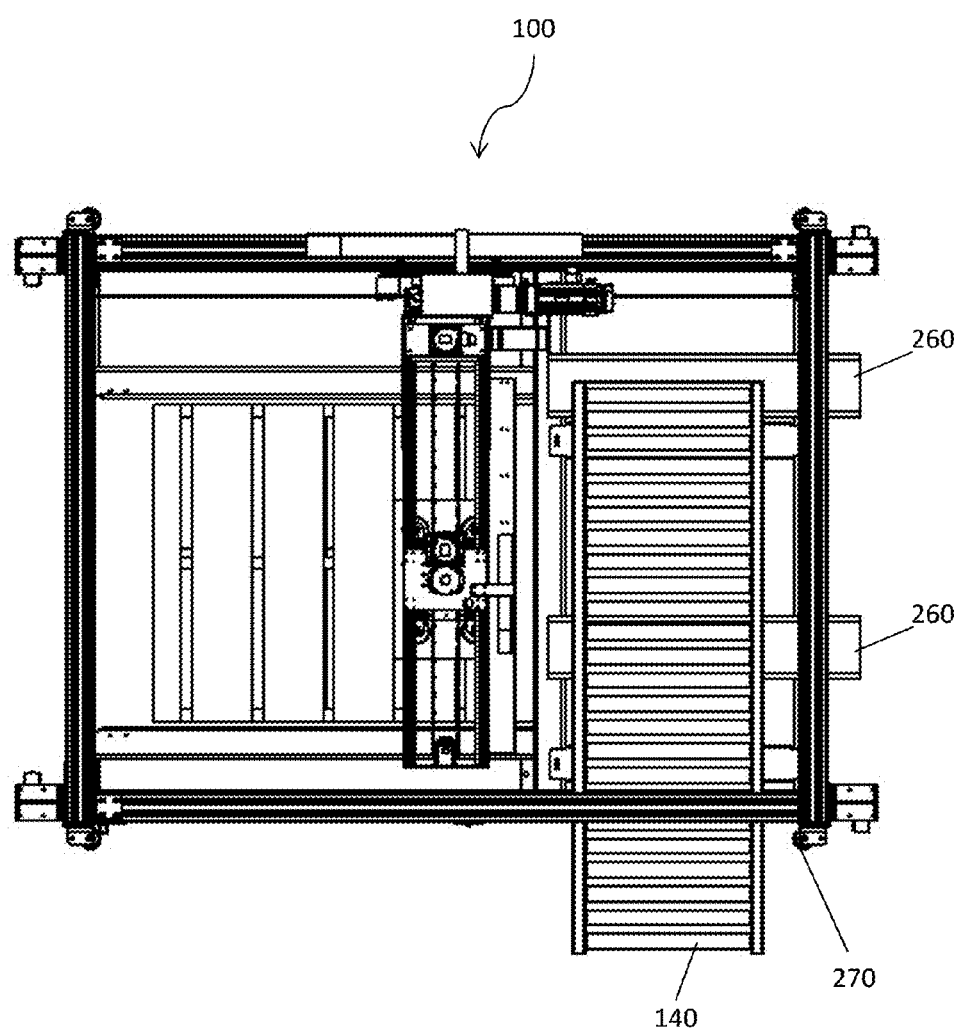
FIG. 5 illustrates a top view of a palletizer according to the present invention.

FIG. 5 illustrates a top view of a palletizer according to the present invention, showing the compact palletizer 100 having a conveyer 140, forklift pockets 260, and wheels 270.

In another embodiment, the present invention includes a skeleton having a base, a frame, and an x-axis structure and panels. Preferably, the frame is constructed of extruded aluminum profile. Preferably, the panels are constructed of polycarbonate. The polycarbonate panels add strength, rigidity, and stiffness to the structure, as well as creating a safe enclosure. In another embodiment, the panels include aluminum diamond plate. The panels provide security and safety by partially enclosing the compact palletizer. In one embodiment, the panels become an integral part of the assembly, thus adding even more rigidity to the already rigid palletizer.

In one embodiment, the compact palletizer also includes glass panels and/or glass doors. The glass panels and/or glass doors are operable to make the interior of the palletizer accessible, as well as to provide visibility into the interior of the palletizer.

Figure 6:
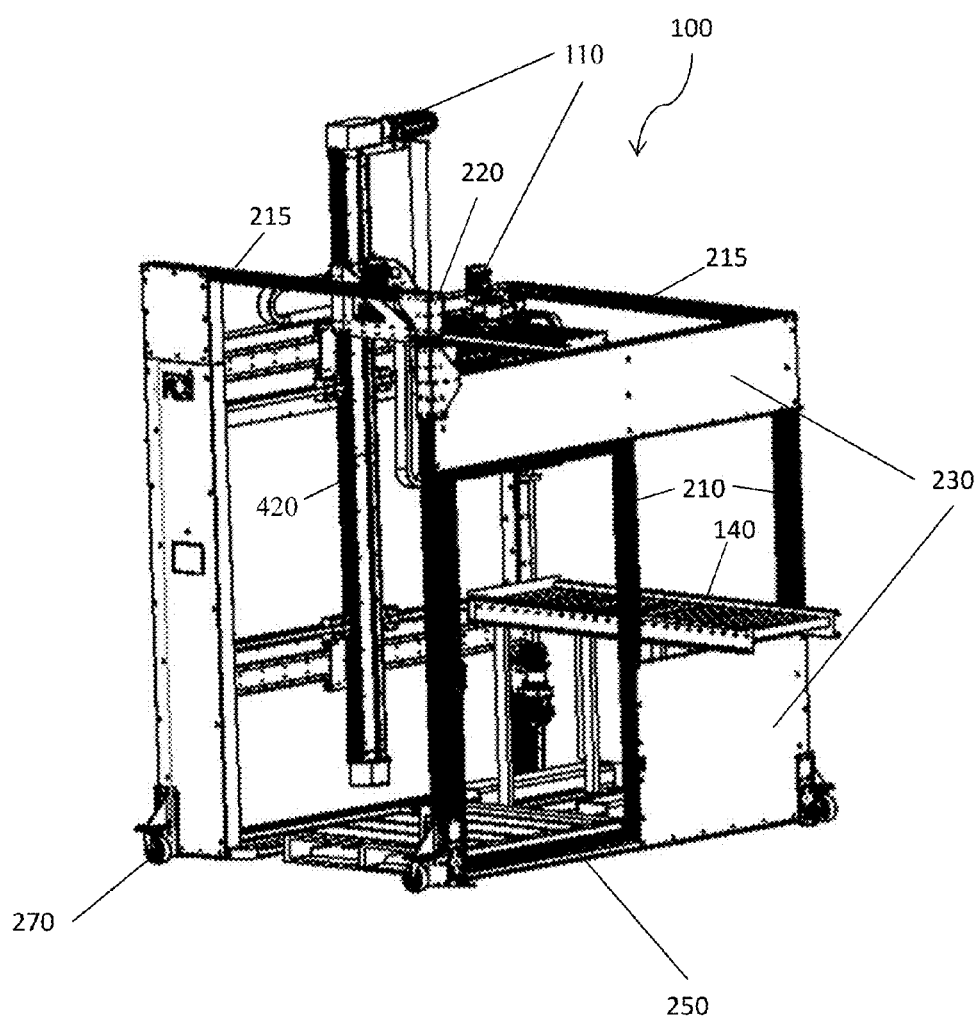
FIG. 6 illustrates a perspective front view of a palletizer with panels according to the present invention.

FIG. 6 illustrates a perspective front view of a palletizer with panels according to the present invention, showing the compact palletizer 100 having motors 110, a conveyer 140, vertical posts of the frame 210, horizontal bars of the frame 215, corner braces 220, a steel base 250, forklift pockets 260, wheels 270, and a spine 420.

Figure 7:
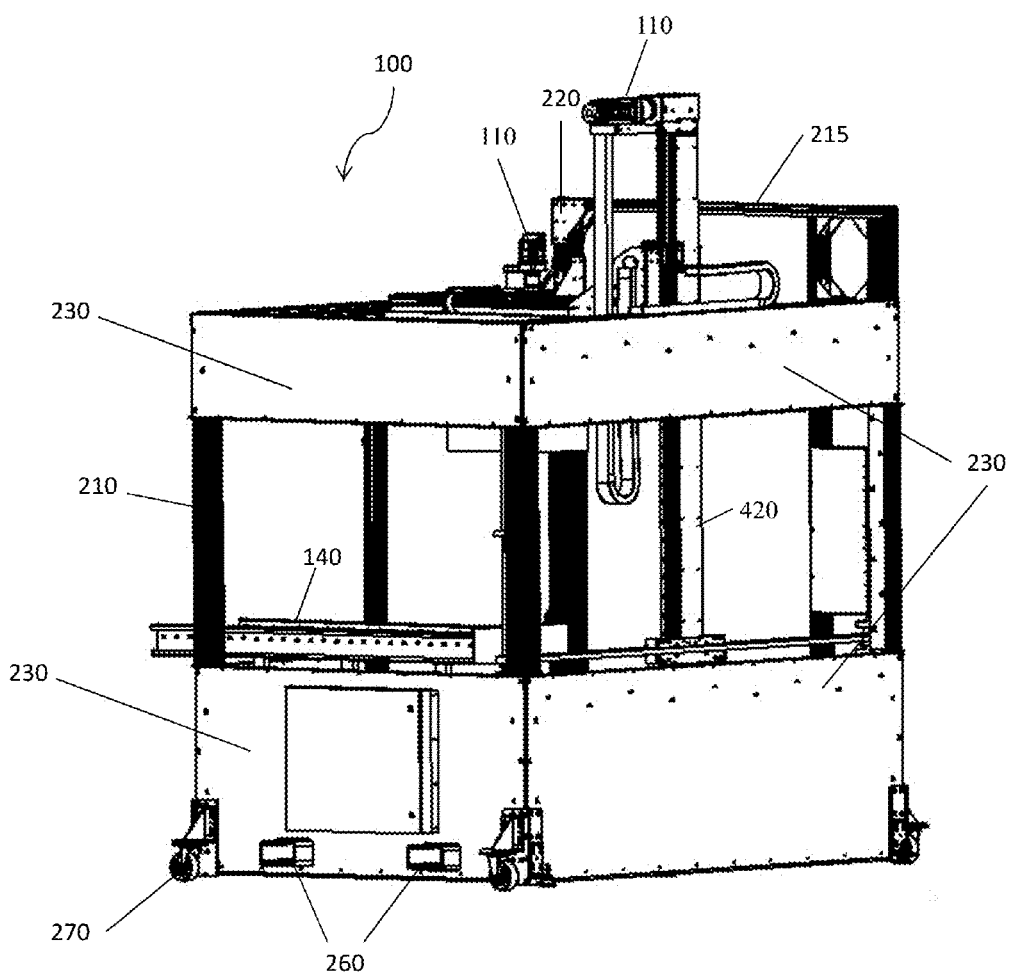
FIG. 7 illustrates a perspective rear view of a palletizer with panels according to the present invention.

FIG. 7 illustrates a perspective rear view of a palletizer with panels according to the present invention, showing the compact palletizer 100 having motors 110, a conveyer 140, vertical posts of the frame 210, horizontal bars of the frame 215, corner braces 220, panels 230, forklift pockets 260, wheels 270, and a spine 420.

Although extruded aluminum profile is preferred for use in the skeleton, other material that is lightweight, has a high tensile strength, and has a high impact resistance can be utilized in the compact palletizer of the present invention. However, stainless steel is preferred for embodiments in the food and food preparation industry because of sanitation concerns. In particular, aluminum is known to collect dust, bacteria, and other contaminants. Therefore, steel tubing may be used instead of extruded aluminum profile where avoidance of collection of dust, bacteria, and other contaminants is desired or required. Because more processing and machining is required for steel, steel would preferably only be used in specific applications where aluminum would not be a suitable material.

Aluminum, and more specifically extruded aluminum profile, is preferred for use in the frame and subassembly components of the present invention because it provides lightweight material with high rigidity, tensile strength and impact resistance. Importantly, traditional engineering principles teach away from the use of extruded aluminum profile material for a compact palletizer machine because it would increase vibration in the overall structure, which would be disadvantageous. However, surprisingly, the compact palletizer of the present invention in its preferred embodiment using extruded aluminum profile is constructed and configured under pretensioning and prestressing with bolted connections that minimize or eliminate vibration. Thus, the present invention solves a longstanding, unmet need for a lightweight, strong, and compact palletizer using extruded aluminum profile that is constructed and configured as described herein to overcome prior art disadvantages with improved structure and faster installation.

In alternative embodiments, specific applications may provide for use of other suitable lightweight, strong metals and metal alloys.. In particular, suitable metals and metal alloys include magnesium, titanium, beryllium, and combinations thereof. More specifically, magnesium may be combined with silicon carbide to form a lightweight metal with record strength. Additionally, a metal alloy comprised of lithium, magnesium, titanium, aluminum, and scandium may be used in the frame and/or subassembly components of the present invention. However, aluminum, and more specifically extruded aluminum profile, is preferred in the present invention because of availability, cost, its high strength, and its light weight. Extruded aluminum profile is preferred for use in the frame of the skeleton because it is a lightweight material with high rigidity, tensile strength and impact resistance. Notably, the extruded aluminum profile frame of the present invention is bolted, not welded. Bolting allows more rapid assembly and easier repair than welding. Additionally, assembly by bolting is currently more cost effective than welding. The compact palletizer is readily portable, and robotic elements of the compact palletizer do not need to be reprogrammed after transport, so installation time is substantially reduced compared with prior art palletizers.

The extruded aluminum profile frame designed and constructed according to the present invention provides unexpectedly improved properties over the prior art. Rather than merely substituting one material (aluminum) for another (such as steel), and obtaining expected results, using an aluminum palletizer provides for enhanced rigidity and stability over a steel palletizer. Using aluminum in components of the palletizer of the present invention also provides for use of smaller motors and gears when compared to motors and gears of a steel palletizer, thereby reducing the weight of the compact palletizer even further.

Additionally, one of ordinary skill in the art would not be motivated to use extruded aluminum profile in the structural components of a palletizer because of concerns about vibrations, rigidity, and durability of an aluminum palletizer.

Figure 8:
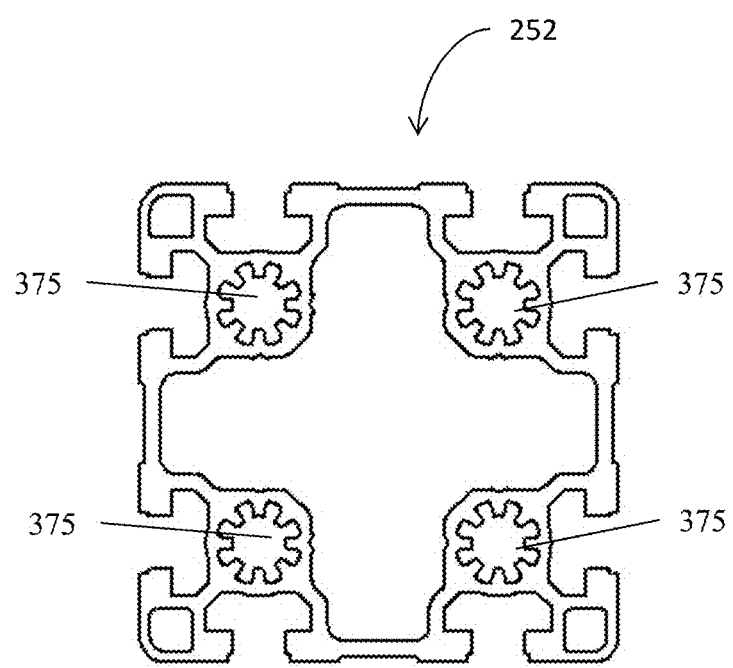
FIG. 8 illustrates an end view of a square profile of extruded aluminum profile used in one embodiment of the present invention.

FIG. 8 illustrates an end view of a square profile of extruded aluminum profile used in one embodiment the present invention. The end view shows precision cut, countersunk holes 375. Preferably, this extruded aluminum profile is used in the horizontal bars of the frame of the present invention. However, any component constructed of extruded aluminum may have this end profile.

Figure 9:
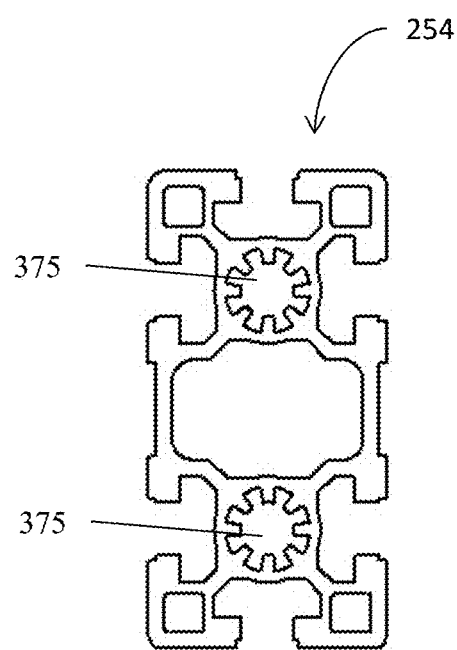
FIG. 9 illustrates an end view of a rectangular profile of extruded aluminum profile used in one embodiment the present invention.

FIG. 9 illustrates an end view of a rectangular profile of extruded aluminum profile used in one embodiment of the present invention. The end view shows precision cut, countersunk holes 375. Preferably, this extruded aluminum profile is used in the vertical posts and horizontal beams of the frame of the present invention. However, any component constructed of extruded aluminum may have this end profile.

There has also been a long-felt but unmet need to provide a palletizer that is easily and efficiently assembled. The compact palletizer of the present invention requires a group of people only 2-3 hours to assemble as opposed to prior art palletizers, which would take an identical or similar group of people 2-3 days to construct. A compact palletizer of the present invention is also movable, as it is on wheels. The compact palletizer is also transportable, solving a long-felt but unmet need. Additionally, the robotic elements of the compact palletizer are preprogrammed and merely require re-homing or re-zeroing, not reprogramming, upon assembly or transport, which solves a long-felt but unmet need of providing a palletizer that does not require reprogramming after being transported to function. There has also been a long-felt need to make palletizers lighter due to concerns about cost and portability, yet an aluminum palletizer has not been successfully commercialized. Another long-felt need is to make palletizers more cost effective, which the present invention provides in one embodiment by providing a palletizer with a frame that can be assembled using bolts, which are more cost effective than welding.

Prior art palletizer frames are typically constructed of steel and held together by welding. The prior art is disadvantageous in that welding steel together is not precise. Additionally, welding steel together provides for a permanently bonded x-frame which is not adjustable. In contrast, the present invention provides for an aluminum x-frame which is precisely assembled and, if necessary or desired, could be adjusted by unfastening the bolts with appropriate tools, adjusting the frame, and refastening the bolts. A surprising advantage of using extruded aluminum profile and bolts, and preferably a pretensioned extruded aluminum profile frame, for construction of the x-frame is that the x-frame is sufficiently rigid, stable, and vibration-less to allow the palletizer to be operated extensively and transported without losing calibration.

Preferably, the palletizer includes a base. In one embodiment, the base is comprised of steel tubing and steel plates. Preferably, the steel tubing and steel plates are welded together to form the base of the compact palletizer. Accommodation is made in the base for positioning a pallet and/or for adding accessories such as conveyors for automatic infeed of empty pallets and outfeed of loaded pallets. The frame also sets the vertical angle (preferably between 1 degree and 2 degrees outward) of the x-frame support columns for tensioning the frame. Pallet infeed is unique for a palletizer of this size. Pallet build-up with pallet feed is also unique. The base preferably includes access for the forks of a forklift to lift and reposition the entire compact palletizer. Preferably, the access for the forks of the forklift are comprised of steel to make the access for the forklift strong and durable and to prevent damage from the forklift. The access for the forks of the forklift are preferably pockets.

Additionally, the base preferably includes wheels for mobility. The compact palletizer is preferably moveable via the wheels, preferably via physical force resulting from one or more persons pushing and/or pulling the compact palletizer.

The frame of the present invention preferably includes at least one x-frame, at least one y-frame, and at least one z-frame. An x-frame preferably includes a top horizontal support beam and a bottom horizontal support beam. The x-frame is preferably constructed of extruded aluminum profile connected with bolts. Preferably, the x-frame is pretensioned or prestressed. The x-frame is attached to the base and frame by attaching the base beam and the bottom horizontal support beam to vertical posts of the frame. The base beam and bottom horizontal support beam are preferably designed and configured such that the vertical posts are angled about 1-2 degree outward at the top. When the top horizontal support beam is attached to the vertical posts, the divergence of the columns is eliminated. This provides for a pretensioned or prestressed x-frame when assembled. Thus, when the top horizontal support beam is attached, preferably via bolts, the tops of the vertical end plates are brought inward towards the vertical, and positioned to be substantially vertical or preferably completely vertical, bringing the entire x-frame under tension. The precision of the x-assembly is provided for by the manufacture process of the vertical posts of the frame, the endplates, the top horizontal support beam, and the bottom horizontal support beam. The endplates are precision cut, for example laser-cut. The endplates preferably also include countersunk holes for precision attachment to the horizontal x-axis support. The endplates are preferably attached to the vertical posts of the frame via bolts. The top horizontal support beam and the bottom horizontal support beam are preferably extruded with internal solid rods, cylinders, or similar shapes which allow for the precision placement of tapped holes. The extrusion process makes the tapping process more precise than other methods. The internal solid rods, cylinders, or similar shapes are preferably tapped (threaded), and the end plates are preferably bolted to these tapped holes; the countersunk holes provide for the precision alignment of the end plates and the horizontal x-axis supports.

When assembling the frame, the vertical posts are preferably slightly angled outward at the top or bottom when attached to the top or bottom support and the lower x-frame support so that when the frame is pulled together at the third support, sufficient tension is created in the skeleton to provide stability. Thus, the skeleton is preferably pre-tensioned or pre-stressed to create rigidity in the structure.

Figure 10:
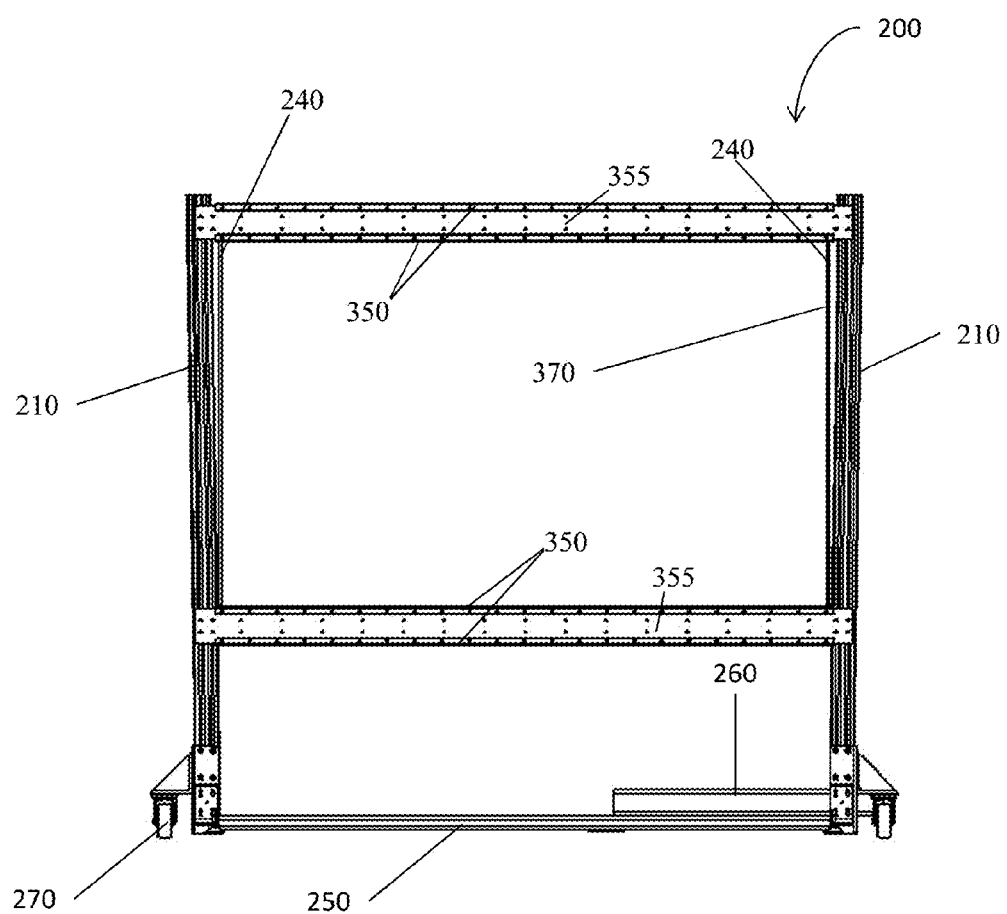
FIG. 10 illustrates a perspective view of a skeleton of a compact palletizer, showing an x-axis structure with a partial frame and illustrating the divergence of the vertical posts of the frame from the vertical during assembly according to the present invention.

FIG. 10 illustrates a perspective view of a skeleton of a compact palletizer, showing an x-axis structure with a partial frame and illustrating the divergence of the vertical posts of the frame from the vertical during assembly according to the present invention, showing part of the skeleton 200 showing vertical posts of the frame 210, the divergence of the vertical posts of the frame from the vertical during assembly by about 1 degree to about 2 degrees, a steel base 250, forklift pockets 260, wheels 270, v-rails 350, plates for mounting v-rails 355, and a vertical end plate 370.

Figure 11:
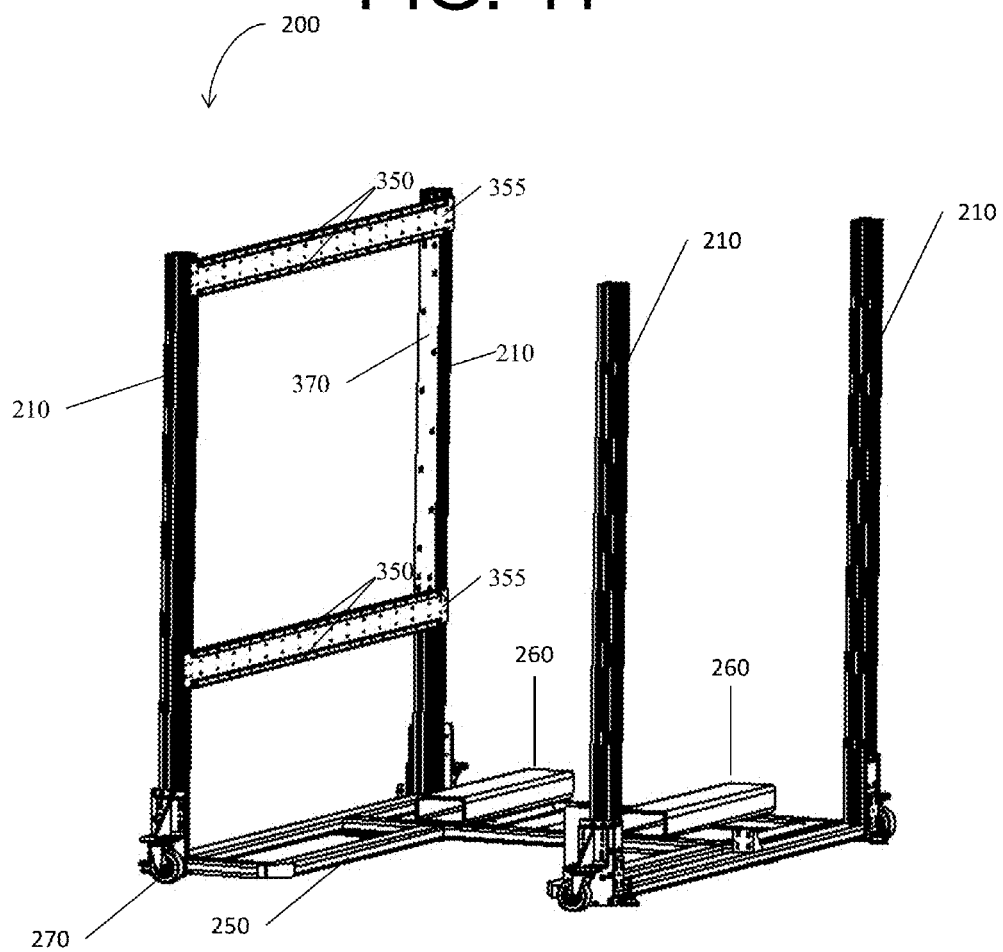
FIG. 11 illustrates a perspective view of part of the skeleton 200 having an x-axis structure, a steel base, and a partial frame according to the present invention.

FIG. 11 illustrates a perspective view of part of the skeleton 200 having an x-axis structure, a steel base, and a partial frame, showing vertical posts of the frame 210, a steel base 250, forklift pockets 260, wheels 270, v-rails 350, plates for mounting v-rails 355, and a vertical end plate 370.

The frame of the present invention preferably includes corner braces. These corner braces provide increased stability and rigidity for the frame.

Figure 12:
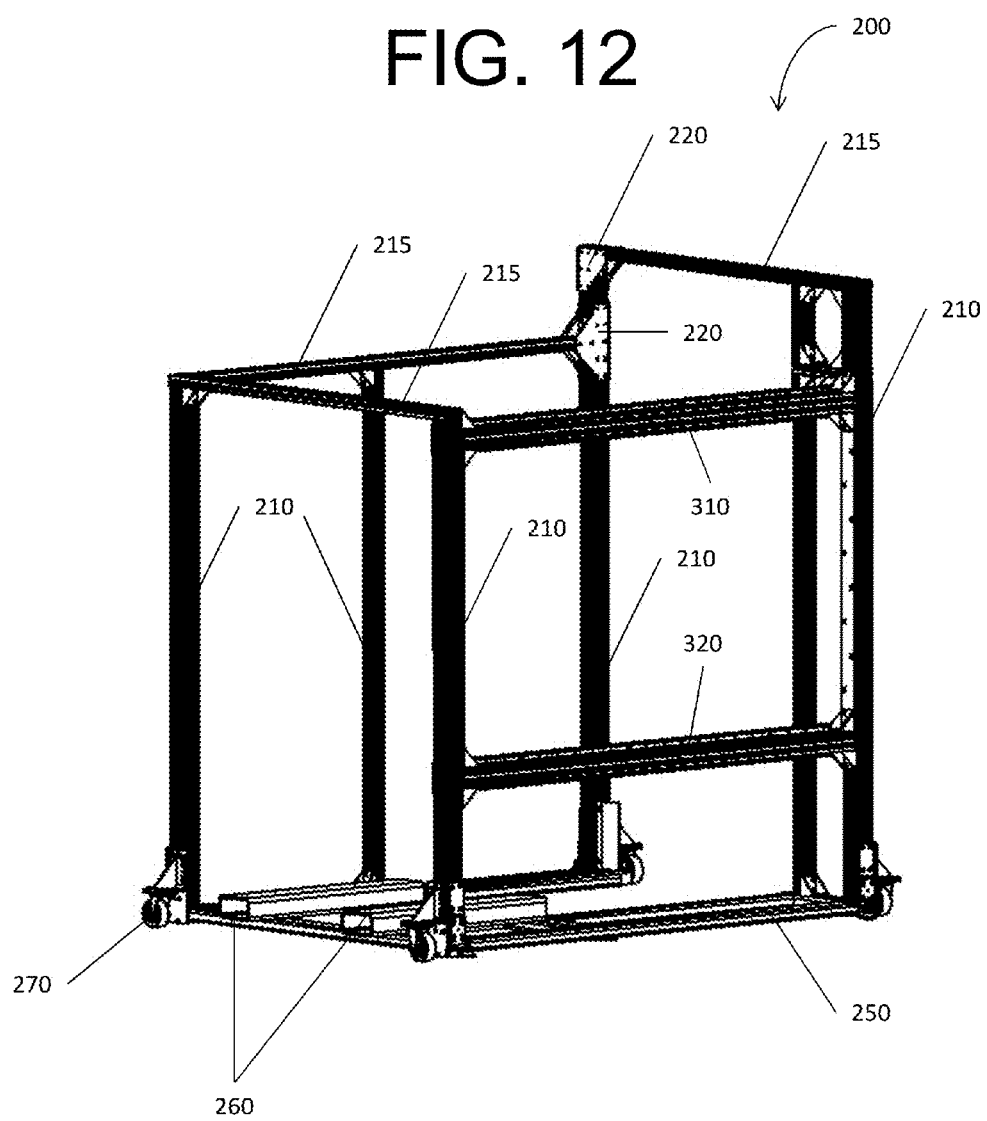
FIG. 12 illustrates a perspective back view of a palletizer skeleton according to the present invention.

FIG. 12 illustrates a perspective back view of a palletizer skeleton according to the present invention, showing the palletizer skeleton having vertical posts of the frame 210, horizontal bars of the frame 215, corner braces 220, a steel base 250, forklift pockets 260, wheels 270, a top horizontal support beam 310, and a bottom horizontal support beam 320.

Figure 13:
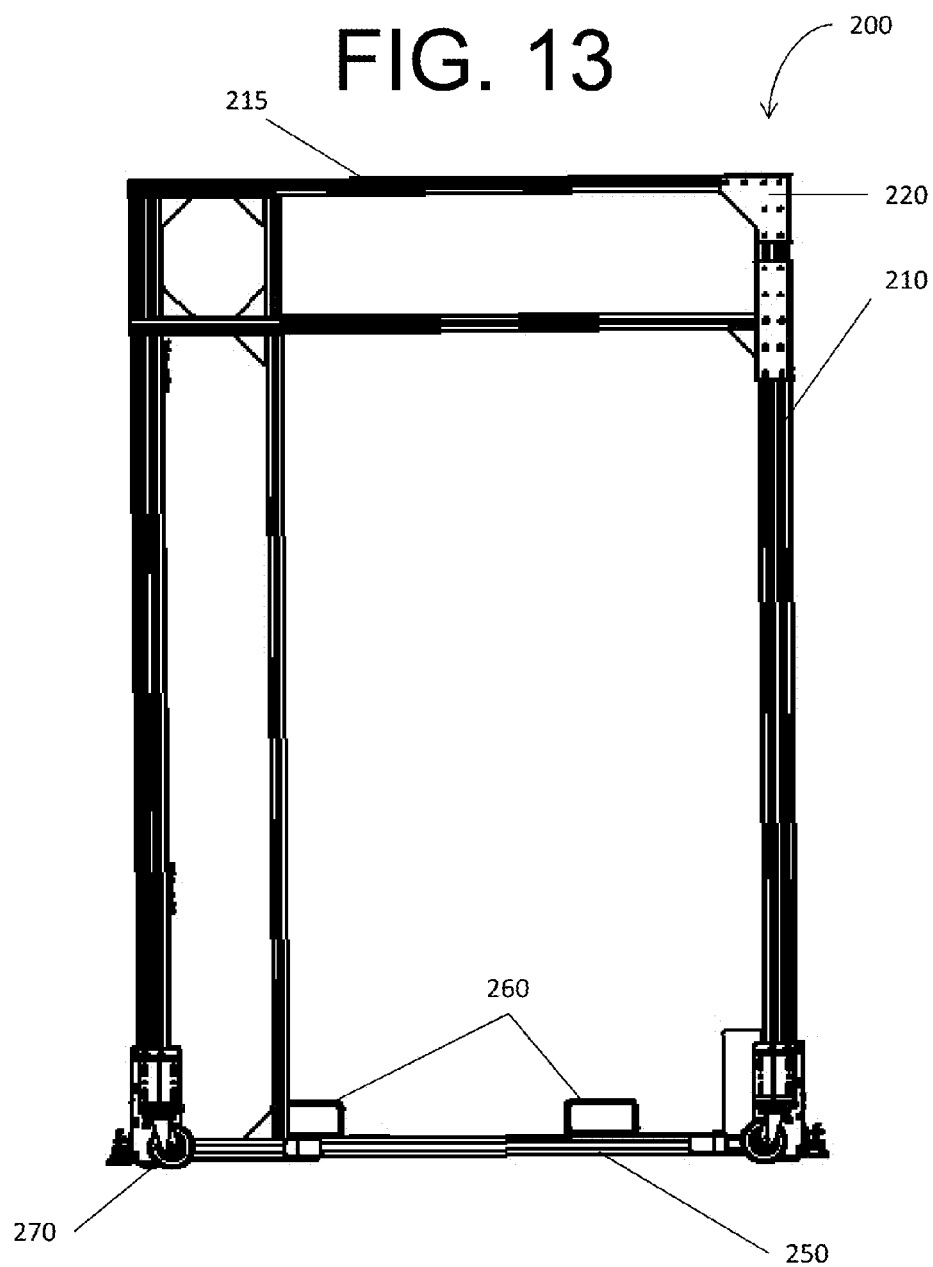
FIG. 13 illustrates a front view of a palletizer skeleton according to the present invention.

FIG. 13 illustrates a front view of a palletizer skeleton according to the present invention, showing the palletizer skeleton having vertical posts of the frame 210, horizontal bars of the frame 215, corner braces 220, a steel base 250, forklift pockets 260, and wheels 270.

Figure 14:
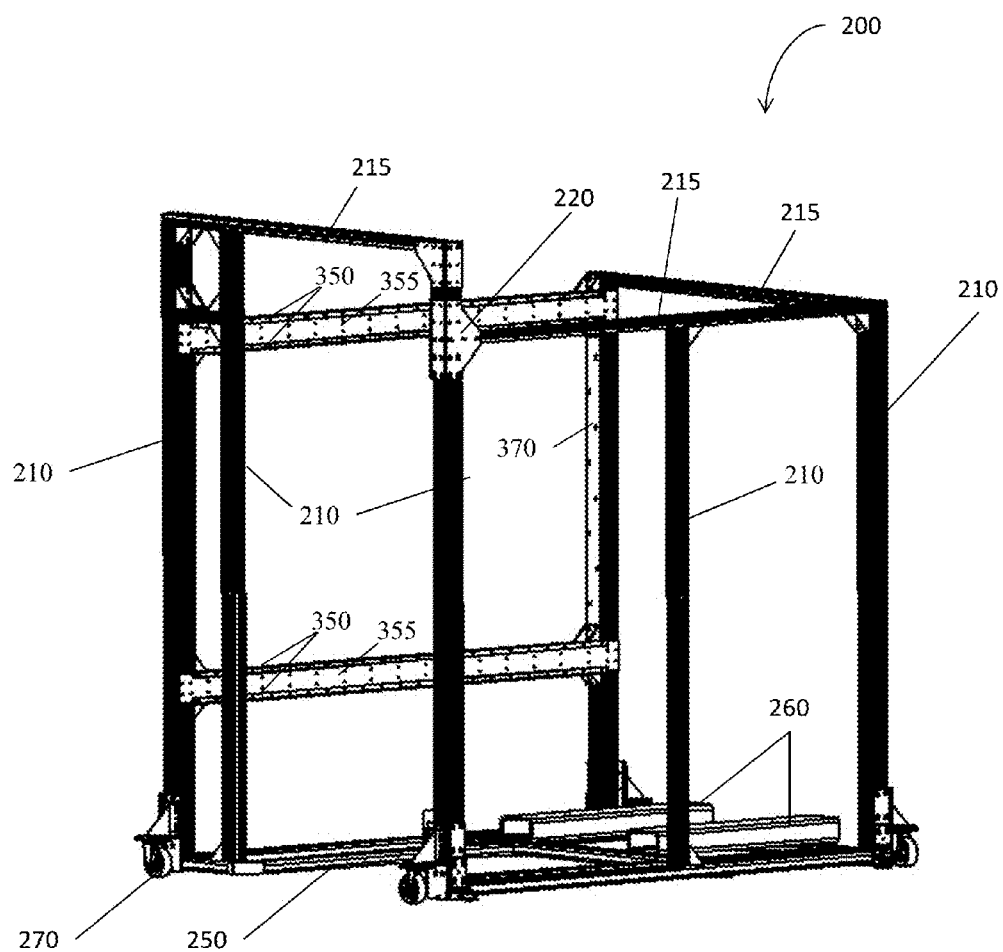
FIG. 14 illustrates a perspective front view of a palletizer skeleton according to the present invention.

FIG. 14 illustrates a perspective front view of a palletizer skeleton according to the present invention, showing the palletizer skeleton 200 having vertical posts of the frame 210, horizontal bars of the frame 215, corner braces 220, a steel base 250, forklift pockets 260, wheels 270, v-rails 350, plates for mounting v-rails 355, and a vertical end plate 370.

Figure 15:
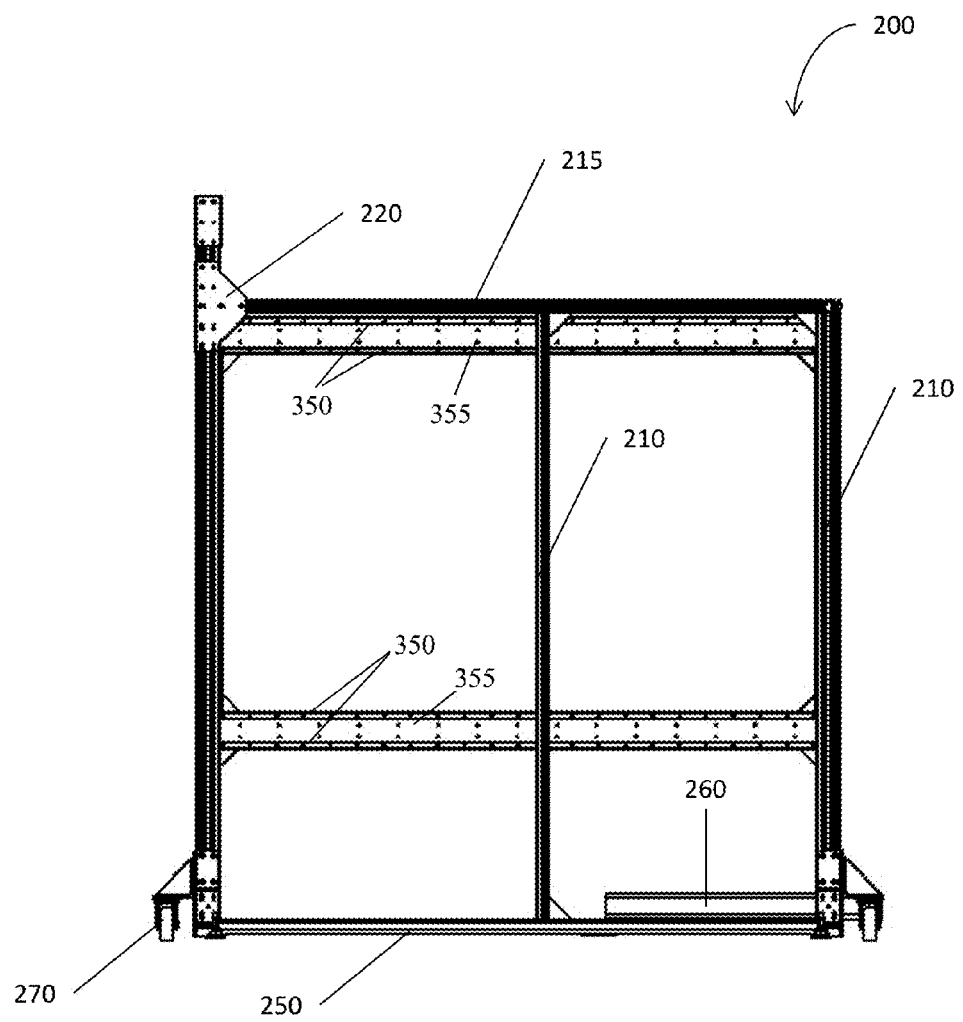
FIG. 15 illustrates a side view of a palletizer skeleton present invention.

FIG. 15 illustrates a side view of a palletizer skeleton present invention, showing the palletizer skeleton 200 having vertical posts of the frame 210, horizontal bars of the frame 215, corner braces 220, a steel base 250, forklift pockets 260, wheels 270, v-rails 350, and plates for mounting v-rails 355.

Figure 16:
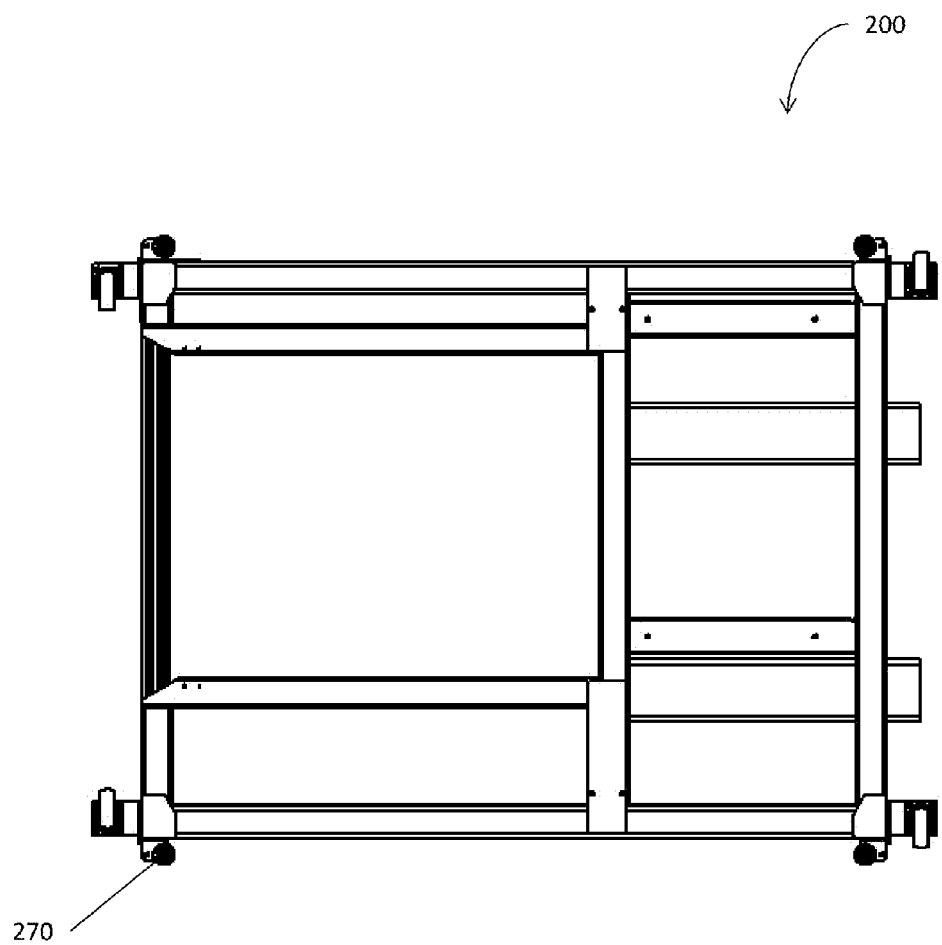
FIG. 16 illustrates a top view of a palletizer skeleton according to the present invention.

FIG. 16 illustrates a top view of a palletizer skeleton according to the present invention, showing wheels 270.

The present invention preferably includes an assembly, wherein the assembly includes an x-axis subassembly, a z-axis subassembly, a y-axis subassembly, and a theta-axis subassembly.

The present invention preferably includes an x-axis subassembly. In one embodiment, the x-axis subassembly is side mounted to the x-axis structure and includes 4 v-guide rails. Advantageously, the 4 v-guide rails are spaced apart to reduce friction in operation of the gantry. Preferably, the x-axis subassembly does not flex.

The x-axis subassembly can be described as a gantry, which is top-mounted in the prior art. However, the gantry of the present invention is preferably side-mounted. Mounting the gantry on the side as in the present invention reduces the overall height of the compact palletizer, which results in a more readily portable compact palletizer for a variety of stack heights when compared to those of the prior art.

Preferably, the gantry includes a parallel, 4 rail system. The 4 rail system includes two pairs of opposing v-rails, wherein the vertical assembly moves on the first pair of the v-rails and the second pair of v-rails prevents the vertical assembly from jumping off the first pair of v-rails. The x-axis is designed such that the first pair of v-rails are maintained parallel to each other and such that the second pair of v-rails are maintained parallel to each other. In one the horizontal assemblies are centered via flat head screws using the holes in the end of the vertical assembly.

By having the gantry side-mounted on the frame, as opposed to top-mounted, the height of the palletizer is reduced, providing a more compact palletizer than possible in the prior art for a variety of palletizers with different stacked pallet heights. The compact palletizer is also more readily portable than the palletizers of the prior art.

In one embodiment, the x-axis subassembly includes at least one timing belt to move the z-axis subassembly horizontally. In another embodiment, the x-axis subassembly includes two belts, preferably a top belt and a bottom belt. This doubles the capacity and prevents binding, thereby allowing a larger load to be moved more quickly than for a single belt.

Using extruded aluminum profile for an x-axis subassembly has presented issues in the prior art, particularly with respect to vibrations. For this reason, the most common material used in palletizer subassemblies has been steel. However, there is a longstanding unmet need for a palletizer that is lighter than a steel palletizer and more readily portable than a steel palletizer, but that maintains a rigidity and stability equivalent or even superior to a steel palletizer. Notably, even if the x-axis subassembly were to be fastened with bolts, vibrations are known to cause release of bolts. However, the present invention solves this problem by utilizing a pretensioned x-axis subassembly to prevent or substantially reduce vibrations and prevent the x-axis from shifting and to prevent release of bolts during operation or transport. These were unexpected results. As discussed above, the use of extruded aluminum profile in an x-axis subassembly or a palletizer frame is not obvious to one of ordinary skill in the art. In fact, one of ordinary skill in the art would discourage the use of bolted aluminum because vibrations and impact from the operation and/or transport of the palletizer would present issues such as the vibrations and impact loosening the bolts, rendering the palletizer less stable. By substantially reducing and even eliminating vibrations in the operation of the palletizer, and by eliminating the loosening of bolts when the palletizer is transported, the present invention provides unexpectedly improved properties over the prior art when extruded aluminum profile is used in the x-assembly and/or in the frame of the palletizer. The subassembly and/or frame is preferably pretensioned or prestressed up to about 1150 Newtons (or up to about 258 lbs-force). However, the subassembly and/or frame is preferably pretensioned or prestressed proportional to the dimensions of the frame. A compact palletizer taller than about 3.35 meters may be pretensioned or prestressed to more than about 1150 Newtons (or more than about 258 lbs-force). Alternatively, the x-axis can be pretensioned by angling the multiplicity of extruded aluminum profile vertical posts between about 1 degree to about 2 degrees from the vertical. The x-axis can also be pretensioned by angling the multiplicity of extruded aluminum profile vertical posts between about 0 degrees and about 2 degrees from the vertical. The top and bottom x-frame support beams are attached to the x-frame support columns, preferably by bolting. The bolting, when combined with the angling of the x-frame support columns about 1-2 degrees from the vertical, provides a pretensioned x-assembly which substantially reduces or eliminates vibrations during operation of the palletizer.

Figure 17:
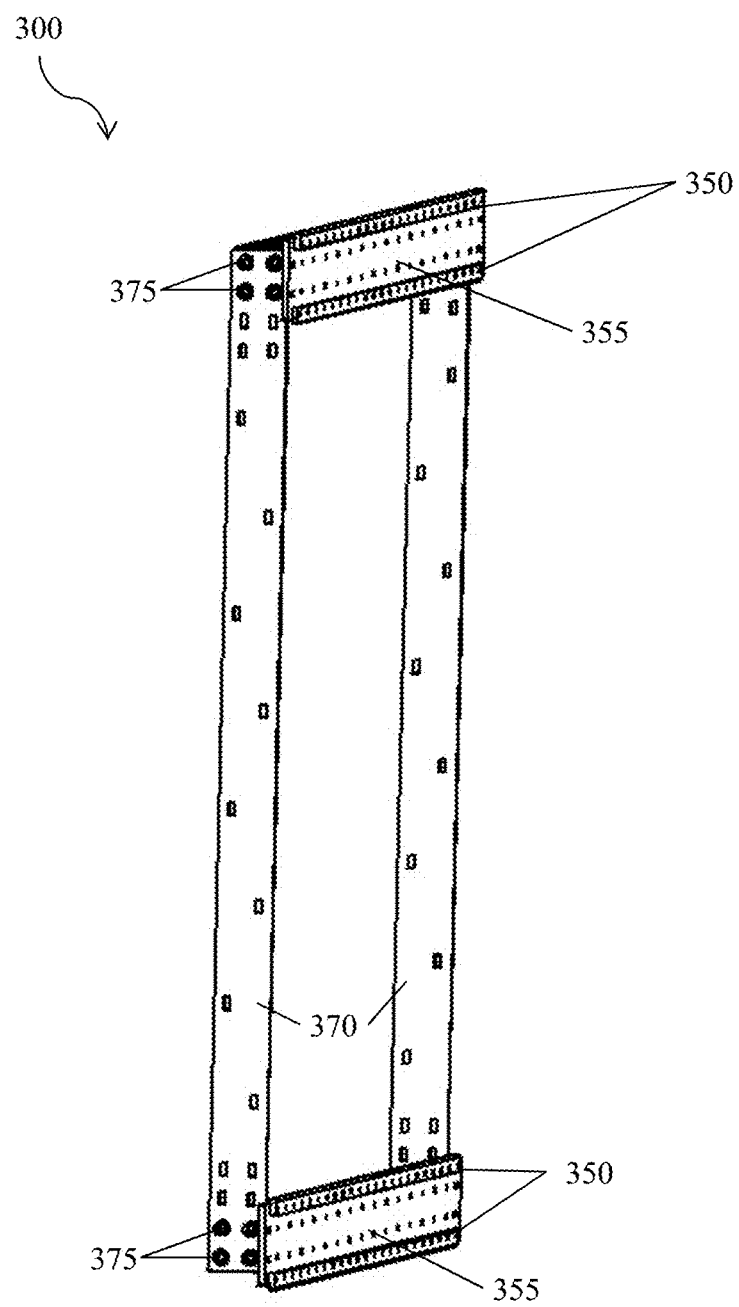
FIG. 17 illustrates a perspective view of the x-axis subassembly according to the present invention.

FIG. 17 illustrates a perspective view of the x-axis subassembly 300 according to the present invention, showing v-rails 350, plates for mounting v-rails 355, vertical end plates 370, and precision cut, countersunk holes 375.

Figure 18:
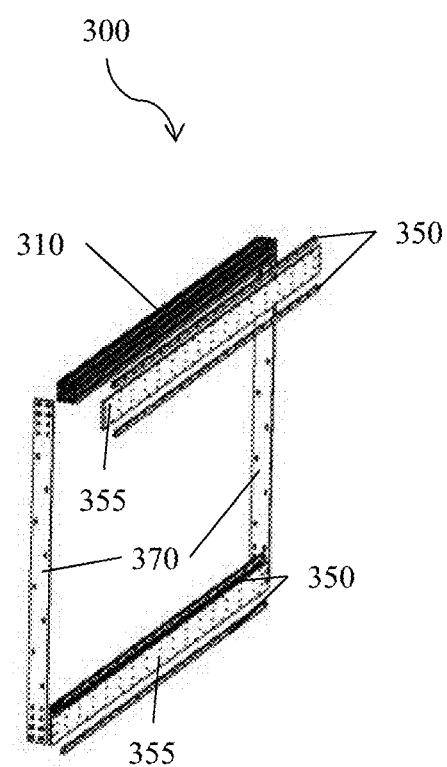
FIG. 18 illustrates an exploded view of the x-axis subassembly according to the present invention.

FIG. 18 illustrates an exploded view of the x-axis subassembly 300 according to the present invention, showing a top horizontal support beam, v-rails 350, plates for mounting v-rails 355, and vertical end plates 370.

The subassembly includes a z-axis subassembly, a y-axis subassembly, and a theta-axis subassembly. The z-axis subassembly, the y-axis subassembly, and/or the theta-axis subassembly of the compact palletizer is preferably manufactured from lightweight profiled structural material, such as profiled aluminum. Preferably, the z-axis subassembly, the y-axis subassembly, and/or the theta-axis subassembly are pretensioned or prestressed.

The z-axis subassembly preferably utilizes two structural aluminum profile components for mounting the spine to the x-axes. These are preferably mounted to the pair of opposing v-rails with 8 v-wheel bearings which provide for x-axis motion. The spine includes two linear, opposing rails for the z-axis movement of the y-arm. Preferably, the z-axis movement of the y-arm is precision guided by two linear rails and 4 bearing blocks. Holes and/or slots are also included, preferably at the top end of the profile, to mount a motor, a gear reducer and a drive sprocket. Preferably, slots and/or holes are provided at the bottom of the profile to mount the idle sprocket. Attached to bearing blocks that slide on the linear rails is a chassis that is designed to take up the slack and tension in the chain that raises and lowers the arm. Notably, the z-axis subassembly does not flex.

Figure 19:
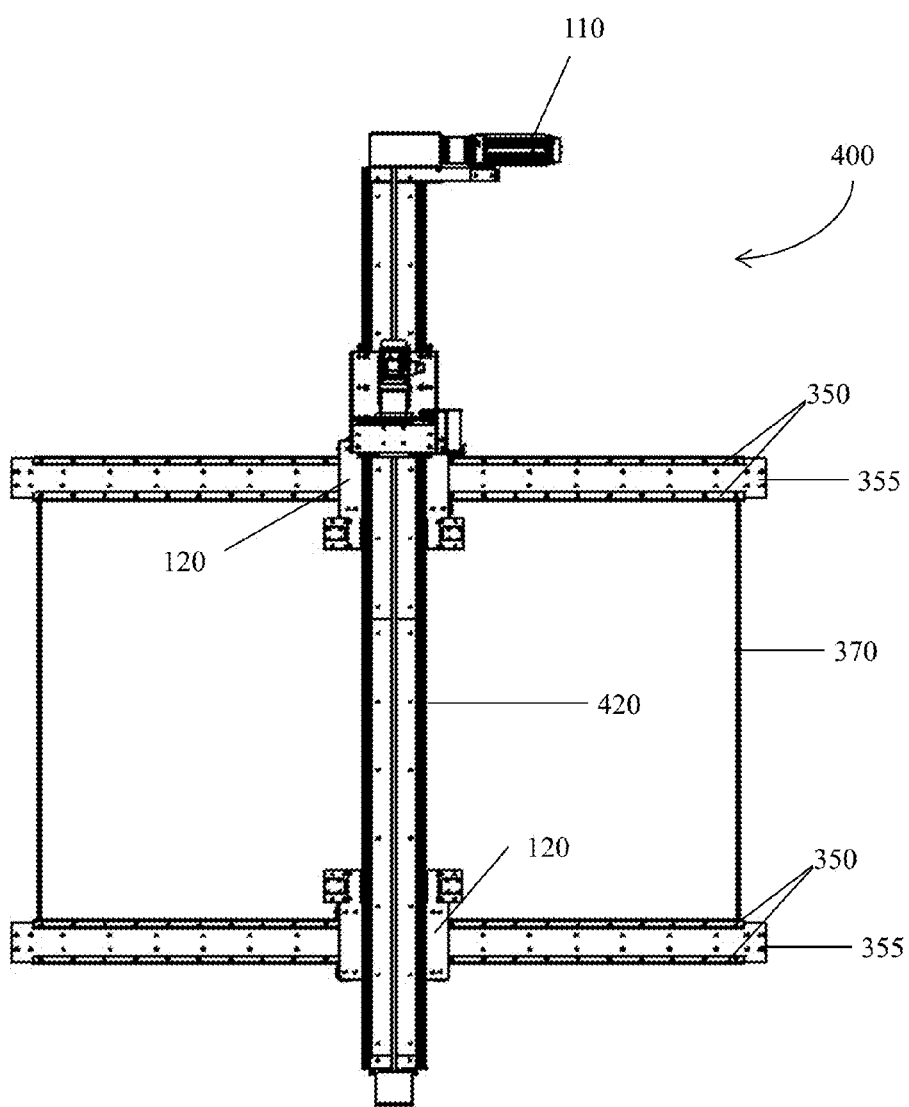
FIG. 19 illustrates a front view of an assembly illustrating the x-axis subassembly and the z-axis subassembly according to the present invention.

FIG. 19 illustrates a front view of an assembly 400 illustrating the x-axis subassembly and the z-axis subassembly according to the present invention, showing motors 110, v-roller mount and belt tensioner 120, v-rails 350, plates for mounting v-rails 355, a vertical end plate 370, and a spine 420.

Figure 20:
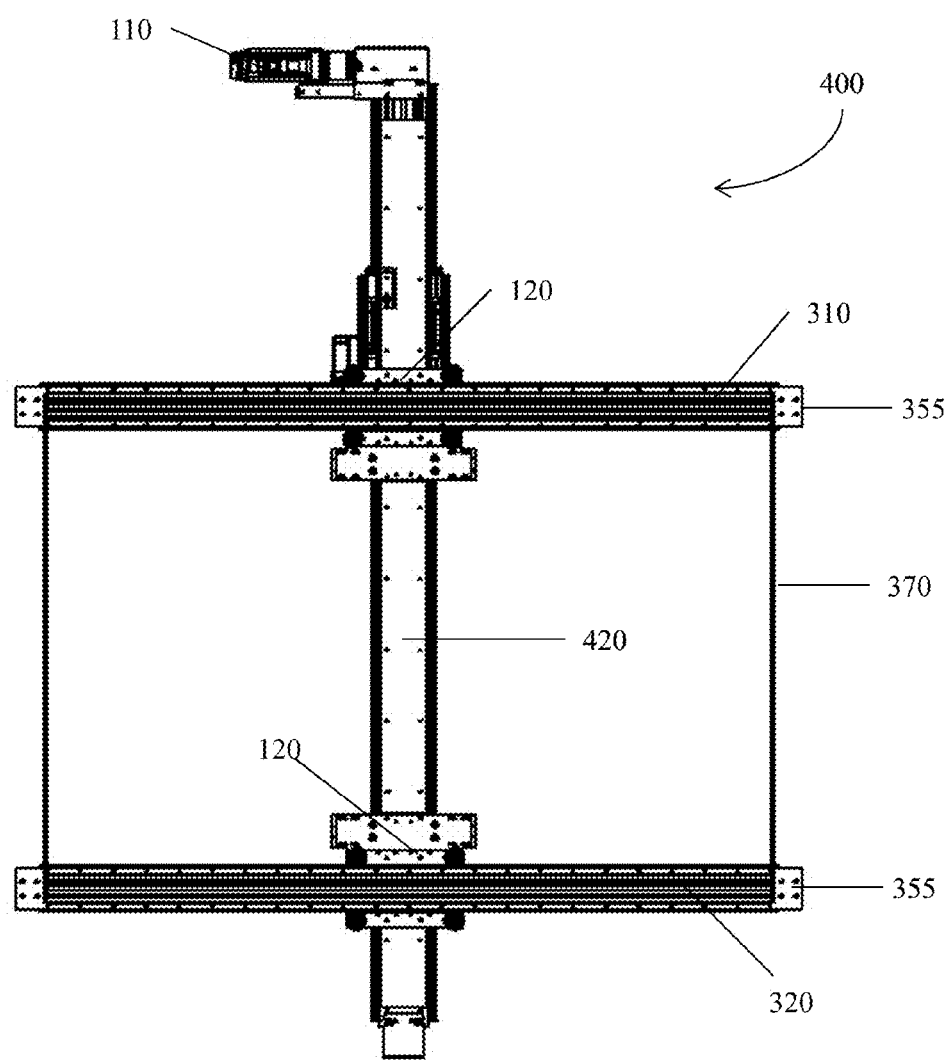
FIG. 20 illustrates a back view of an assembly illustrating the x-axis subassembly and the z-axis subassembly according to the present invention.

FIG. 20 illustrates a back view of an assembly 400 illustrating the x-axis subassembly and the z-axis subassembly according to the present invention, showing motors 110, v-roller mount and belt tensioner 120, a top horizontal support beam 310, a bottom horizontal support beam 320, plates for mounting v-rails 355, a vertical end plate 370, and a spine 420.

The y-axis subassembly preferably includes an arm which utilizes two pieces of structural aluminum profile spaced apart to allow for insertion of a timing belt. The y-axis subassembly is preferably attached to the z-axis subassembly via the chassis of the z-axis subassembly. The y-axis subassembly is preferably attached to the theta subassembly between an idle pulley and a drive pulley. Mounted to the top of the arm are two linear rails and 4 bearing blocks that guide the y-axis subassembly and theta subassembly. In one embodiment, the end of the profile includes holes to set spacing. In another embodiment, t-slots are also included for attaching side gussets. The bottom of the arm preferably includes a cable track tray. The arm is preferably a cantilever arm. The y-axis subassembly/arm can preferably flex between about 0 millimeters (about 0 inches) and about 3.175 millimeters (about ⅛ inch) under full load, which in one embodiment is about 100 kg (or about 220 lbs). In another embodiment, the y-axis subassembly/arm can preferably flex between about 0 millimeters (about 0 inches) and about 1.5875 millimeters (about 1/16 inch) under partial load, which in one embodiment is about 50 kg (or about 110 lbs). This amount of flex is slightly more than in a steel structure, but is not enough to cause performance issues. In fact, the assembly is lighter a steel structure and can be moved faster and more precisely with smaller motors.

Figure 21:
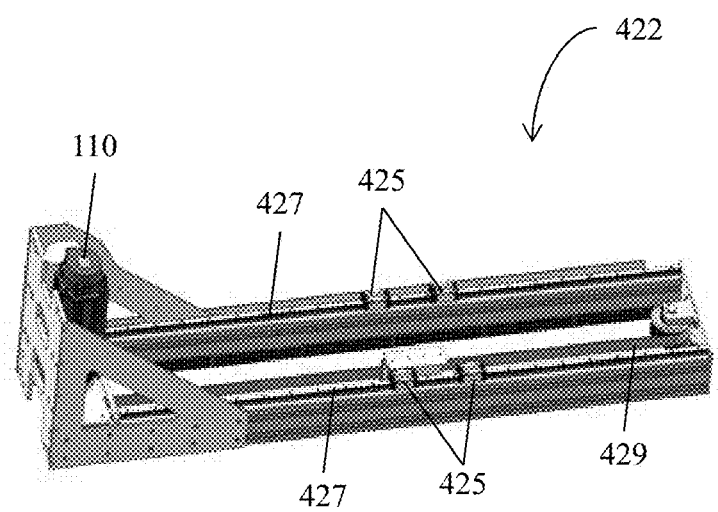
FIG. 21 illustrates the y-axis assembly according to the present invention.

FIG. 21 illustrates the y-axis subassembly 422 according to the present invention, showing a motor 110, bearing blocks 425, linear rails 427, and a timing belt for y-axis motion 429.

The present invention preferably includes a theta axis subassembly for rotating an end of arm tooling (EOAT) assembly used to move items from the conveyor to be stacked on a pallet or vice versa. The theta axis assembly is preferably mounted to the 4 bearing blocks on the y-axis subassembly. The EOAT assembly preferably moves back and forth on the y-axis arm via the theta axis subassembly. The theta axis subassembly preferably carries a motor and precision rotary bearing assembly that allows the load to be rotated up to about 365 degrees in either direction.

The EOAT assembly acts as the interface between the palletizer and the items loaded and/or unloaded by the palletizer, including box(es), bag(s), and/or pail(s). The EOAT assembly will have many variations to fit specific customer requirements. Basic units will handle single, double, triple or more boxes, as well as one bag (up to 36 kg [80 lbs]) at a time or multiple pails (up to 3 at a time). The palletizer can use any EOAT appropriate for the palletizing task. By way of example and not limitation, adjustable bag grippers, side clamps, fork-style tools, and/or vacuum technology tools can be utilized. However, any prehensile end effector can be used, including impactive, ingressive, astrictive, and contigutive end effectors. Impactive effectors include jaws or claws which physically grasp the object by using direct impact upon the object. Ingressive effectors include pins, needles or hackles which physically penetrate the surface of the object (used in textile, carbon and glass fiber handling). Astrictive effectors are those that produce a binding force using a field, and include vacuum, magneto- or electroadhesion. Contigutive effectors require direct contact for adhesion to take place, such as glue, surface tension, or freezing.

Notably, the x, y, z, and theta subassemblies are modular in order to facilitate assembly and disassembly. In one embodiment, the frame of the present invention is integral. Notably, the compact palletizer of the present invention is readily portable, while being rigid, lightweight, and compact. The rigidity of the compact palletizer allows the palletizer to remain precise and accurate in the placement of items after transport, and even several transports. Precision is achieved by small tolerances. Rigidity prevents larger tolerances from developing. Transport does not affect the accuracy or precision of the compact palletizer. The robotic elements of the compact palletizer are preferably preprogrammed, and merely need to be re-homed or re-zeroed after transport.

Figure 22:
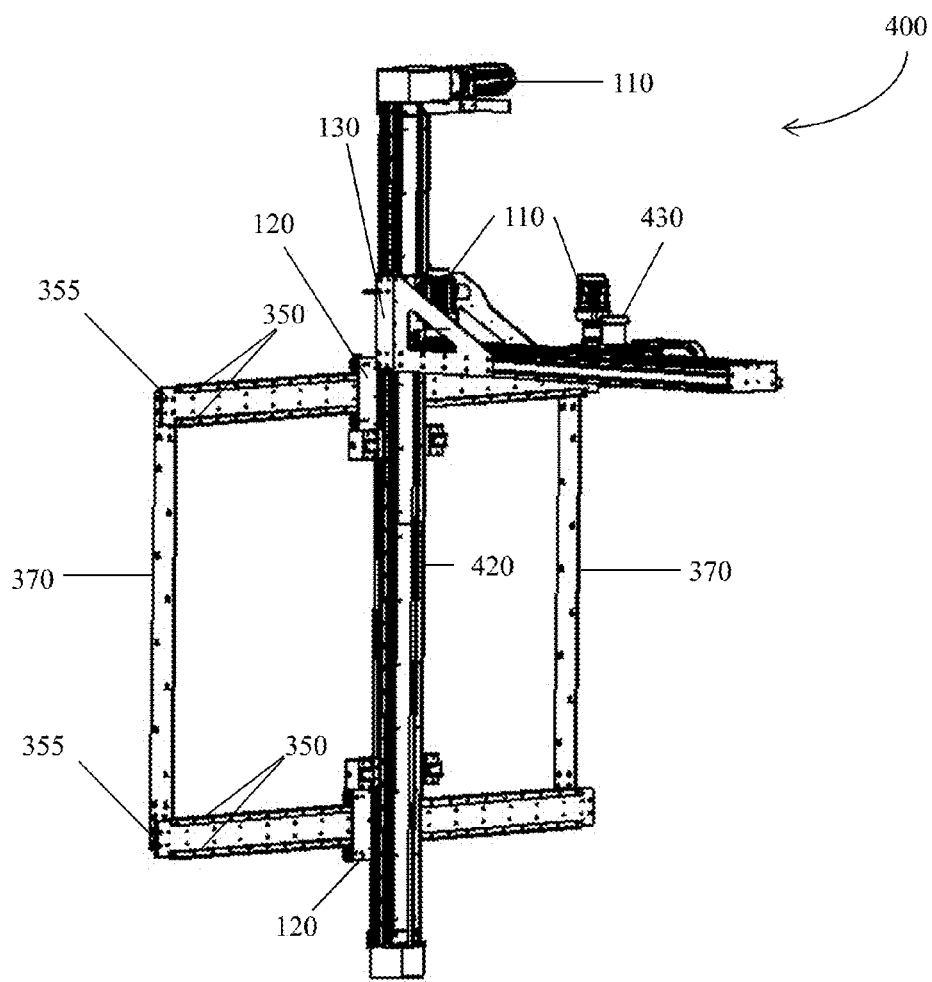
FIG. 22 illustrates a perspective view of an assembly illustrating the x-axis subassembly, the z-axis subassembly, the y-axis subassembly, and the theta-axis subassembly according to the present invention.

FIG. 22 illustrates a perspective view of an assembly illustrating the x-axis subassembly, the z-axis subassembly, the y-axis subassembly, and the theta-axis subassembly according to the present invention, showing motors 110, v-roller mount and belt tensioner 120, a chassis 130, v-rails 350, plates for mounting v-rails 355, vertical end plates 370, a spine 420, and a rotary bearing 430.

Figure 23:
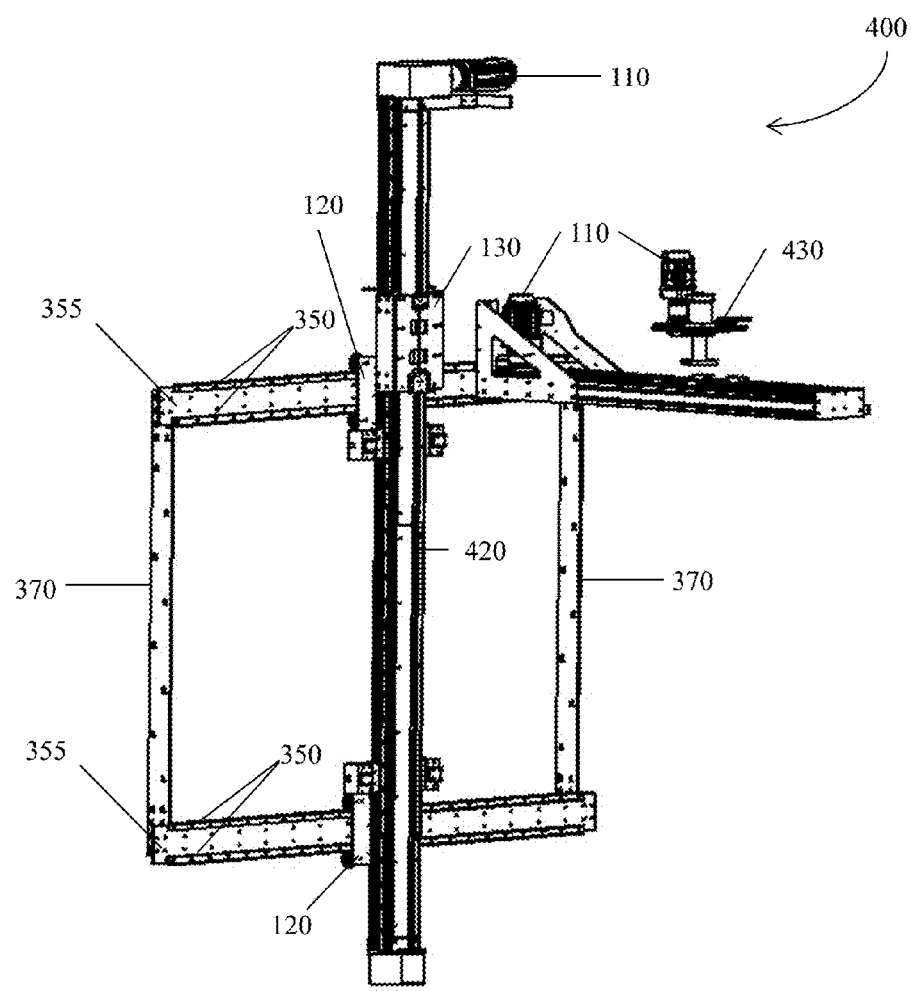
FIG. 23 illustrates a perspective exploded view of an assembly illustrating the x-axis subassembly, the z-axis subassembly, the y-axis subassembly, and the theta-axis subassembly according to the present invention.

FIG. 23 illustrates a perspective exploded view of an assembly illustrating the x-axis subassembly, the z-axis subassembly, the y-axis subassembly, and the theta-axis subassembly according to the present invention, showing motors 110, v-roller mount and belt tensioner 120, a chassis 130, v-rails 350, plates for mounting v-rails 355, vertical end plates 370, a spine 420, and a rotary bearing 430.

Figure 24:
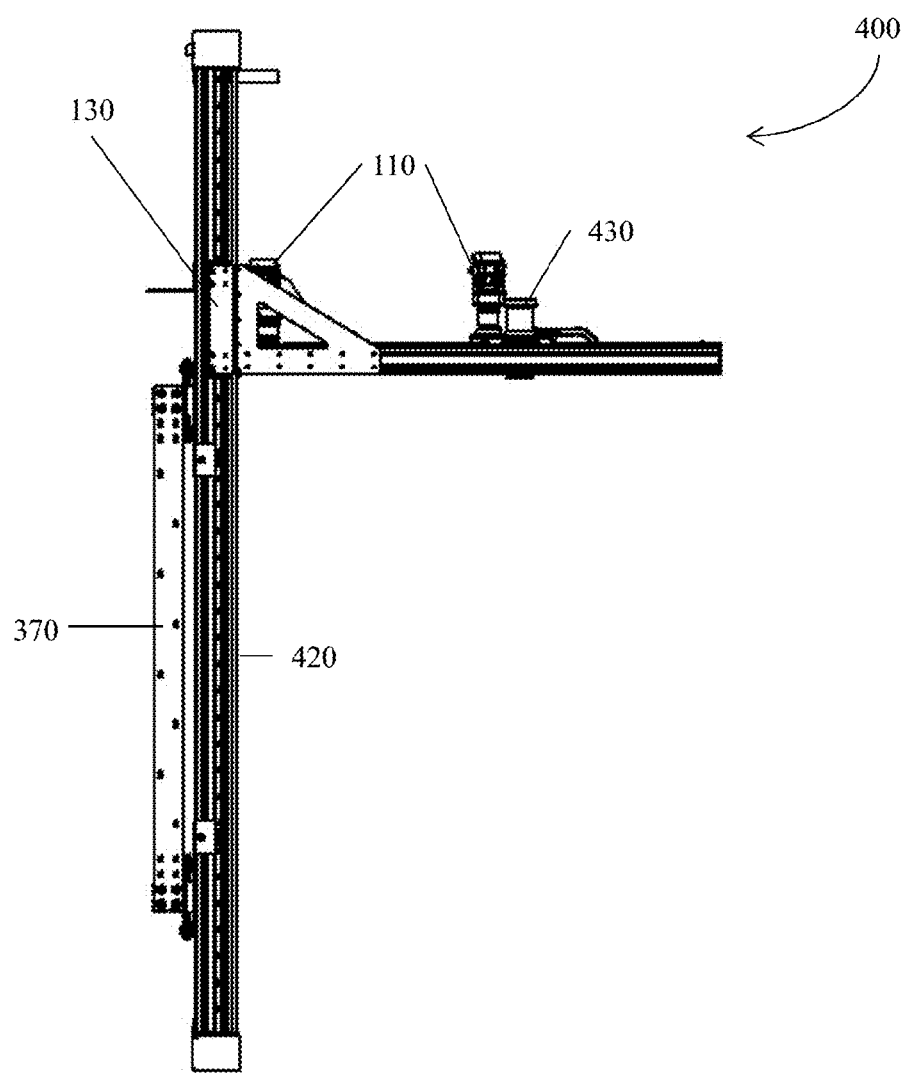
FIG. 24 illustrates a side view of an assembly illustrating the x-axis subassembly, the z-axis subassembly, the y-axis subassembly, and the theta-axis subassembly according to the present invention.

FIG. 24 illustrates a side view of an assembly illustrating the x-axis subassembly, the z-axis subassembly, the y-axis subassembly, and the theta-axis subassembly according to the present invention, showing motors 110, a chassis 130, vertical end plates 370, a spine 420, and a rotary bearing 430.

The compact palletizer can preferably be assembled rapidly. The portable construction of the compact palletizer allows easy assembly at a site, merely requiring attachment of the spine, the z-axis subassembly and set-up of the robotic elements. Preferably, the robotic elements of the compact palletizer are preprogrammed and merely require re-homing or re-zeroing, not re-programming, upon assembly or transport. Notably, the compact palletizer of the present invention requires a group of people only 2-3 hours to assemble as opposed to prior art palletizers, which would take an identical or similar group of people 2-3 days to construct from single components.

In another embodiment, the compact palletizer has a unitary and integrated uni-body construction.

The compact palletizer is notably lightweight when compared with the palletizers of the prior art. A base frame comprising a welded steel frame with fork pockets and wheels, wherein the welded steel frame includes steel tubing and steel plates welded together, wherein the frame also sets a vertical angle of about 1 degree to about 2 degrees outwards of the posts for tensioning. The frame weighs approximately 290 kg (638 lbs) in one embodiment of the present invention. Lightweight—the moving subassemblies, z-, y- and theta-axes, manufactured from extruded aluminum profile materials weigh about 237 kg (631 lbs) in one embodiment of the present invention. An x-axis structure v-guide rail mount, comprised of 2 pieces of structural aluminum profile, two precision cut aluminum plates for mounting the 4v-guide rails, and 2 precision cut aluminum plates to set the spacing between the top and bottom rails and to insure parallel assembly of the top and bottom rails weighs approximately 70 kg (154 lbs) in one embodiment of the present invention. A base frame, x-axis structure, and skeleton (structural aluminum profile frame) which does not include any panels, but includes vertical posts which are slightly angled outwards (approximately between about 1 degree and 2 degrees), wherein the skeleton is prestressed, weighs approximately 495 kg (or approximately 1089 lbs) in one embodiment of the present invention. A z-axis subassembly which utilizes two structural extruded aluminum profile components for the spine, which are mounted to the two v-guide bearing assembles for x-axis motion and to two linear rails for vertical stroke of the arm, wherein the two structural aluminum profile components include holes in the end of the profiles, slots to mount a motor, gear reducer, and drive sprocket, and slots at the bottom to mount an idle sprocket, wherein the two structural extruded aluminum profile components also include a chassis attached to the bearing blocks that slide on the linear rails, weighs approximately 160 kg (or approximately 352 lbs) in one embodiment of the present invention. A y-axis subassembly which includes an arm utilizing two pieces of structural extruded aluminum profile, having two linear rails and 4 bearing blocks mounted to the top of the arm, with holes in the end of the profile to set the spacing and to utilize t-slots for attaching side gussets, wherein the bottom of the arm includes a cable track tray, weighs approximately 55 kg (or approximately 121 lbs) in one embodiment of the present invention. A theta axis subassembly, which carries a motor and a precision rotary bearing assembly, weighs approximately 22 kg (or approximately 48.4 lbs) in one embodiment of the present invention. An end of arm tooling (EOAT) assembly weighs between approximately 5 kg (or approximately 11 lbs) and approximately 50 kg (or approximately 110 lbs) in one embodiment of the present invention. Thus, the total compact palletizer assembly weighs approximately 1451 kg (or approximately 3192 lbs) in one embodiment of the present invention.

The lighter weight of the compact palletizer provided by using extruded aluminum profile in the palletizer makes the gross weight lower, and thus allows for the use of smaller motors and gears, thereby reducing the weight of the compact palletizer even further. This unexpected result of using smaller motors and gears, and further reducing the weight of the palletizer is advantageous over the prior art. Additionally, the pairs of the rails on the x-axis provide stability and rigidity for the palletizer and prevent binding, allowing the assembly to move at much faster speeds than possible in the prior art. By way of example, a load of about 100 kg can be moved at about 1000 mm/sec (or about 3.3 ft/sec). If the load is lighter, the load can be moved even faster, depending on the stability of the product and EOAT design, up to about 2000 mm/sec (or about 6.5 ft/sec). The ability to move loads faster by using aluminum for key components of the palletizer, and therefore lighter motors and gears, is yet another unexpected and nonobvious result. Additionally, velocity and acceleration of the loads can be adjusted and/or optimized in the present invention.

The compact palletizer of the present invention optionally includes accessories. Notably, accessories do not impact the envelope of the compact palletizer. The accessories are preferably modular and attach to the compact palletizer from the outside. One accessory is a pallet in-feed. The pallet in-feed is operable to be positioned to enter the palletizer from the left, right, front, and/or back; in other words, the pallet in-feed is operable to be positioned to enter the palletizer from any side.

Figure 25:
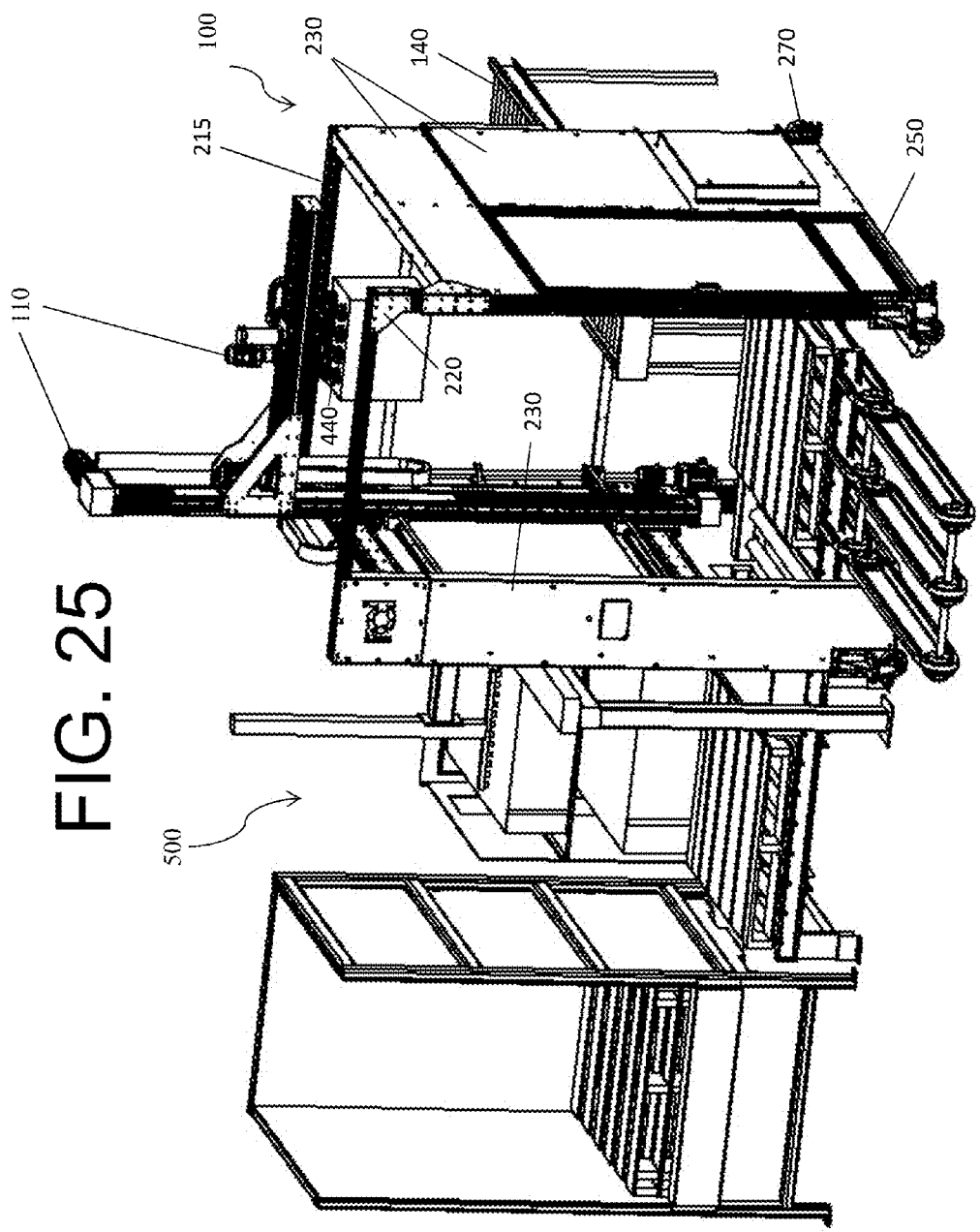
FIG. 25 illustrates a perspective front view of a palletizer with a pallet feed according to the present invention.

FIG. 25 illustrates a perspective front view of a palletizer 100 with a pallet feed 500 according to the present invention, showing motors 110, a conveyer 140, horizontal bars of the frame 215, corner braces 220, panels 230, a steel base 250, wheels 270, and an end of arm tooling (EOAT) assembly 440.

Additionally, a conveyer of the pallet in-feed has multiple "zones" in one embodiment of the present invention. These zones provide for separating the loads into discrete segments on the conveyer, preferably via sensing technology such as lasers, IR, etc., and optimize management and processing of the loads into the palletizer. Yet another accessory is a box buffering system. The box buffering system is preferably combined with the conveyer to provide for an auto-feed pallet in-feed system. A tier sheet dispenser may also be utilized in one embodiment of the present invention. The tier sheet dispenser is preferably unique for a compact palletizer having a stack height of about 2.57 meters (or about 8 feet 5 inches), with a total height of about 3.35 meters (or about 11 feet), and for a compact palletizer having a stack height of about 1.52 meters (or about 5 feet), with a total height of about 2.43 meters (or about 8 feet). Tier sheets are utilized between layers of product stacked on a pallet and create a more stable/transportable unit. Due to the size of the tier sheet, numerous engineering concerns were addressed to add the tier sheet dispenser to a compact palletizer of this size, specifically a compact palletizer having a stack height of about 2.57 meters (or about 8 feet 5 inches), with a total height of about 3.35 meters (or about 11 feet), or a compact palletizer is a compact palletizer having a stack height of about 1.52 meters (or about 5 feet), with a total height of about 2.43 meters (or about 8 feet). Due to the size of the palletizer envelope, a tier sheet is dispensed one at a time into the palletizer through a side or rear panel. Another accessory includes a stretch wrapper. In one embodiment, the stretch wrapper is integrated into the frame. Preferably, the stretch wrapper provides for stretch wrapping an entire pallet complete with its load. In another embodiment, the stretch wrapper is operable to wrap loads individually. In yet another embodiment, the stretch wrapper is operable to stretch wrap more than one load together.

Figure 26:
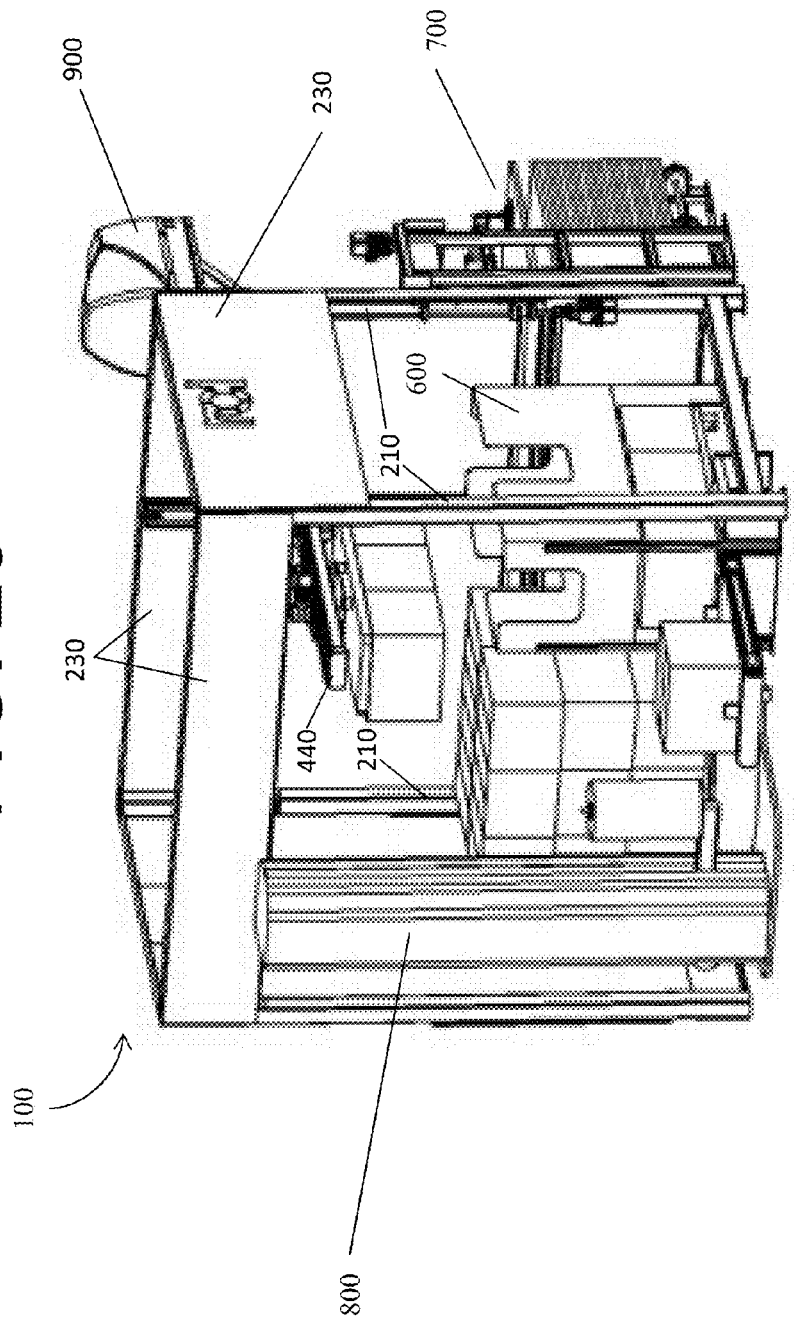
FIG. 26 illustrates a perspective front view of a palletizer with stretch wrapping and box buffering accessories according to the present invention.

FIG. 26 illustrates a perspective front view of a palletizer 100 with stretch wrapping and box buffering accessories according to the present invention, showing vertical posts of the frame 210, panels 230, a box buffering system 600, a tier sheet dispenser 700, a stretch wrapper, and 800, and a large capacity vacuum blower mounted in a silencer box 900.

The compact palletizer of the present invention preferably is operable to be constructed in many sizes. A preferred size of the compact palletizer is a compact palletizer having a stack height of about 2.57 meters (or about 8 feet 5 inches), with a total height of about 3.35 meters (or about 11 feet). In another embodiment, a preferred size of the compact palletizer is a compact palletizer having a stack height of about 1.52 meters (or about 5 feet), with a total height of about 2.43 meters (or about 8 feet). The present invention can place product onto standard size USA or European pallets. Notably, the palletizer of the present invention has a stack height to palletizer height ratio of as high as about 0.767.

Another embodiment of the present invention provides for a depalletizer. The depalletizer of the present invention is similar to the compact palletizer of the present invention, and utilizes many of the same components. However, the depalletizer preferably uses a longer x-axis. In one embodiment, the x-axis of the depalletizer is about 10 feet. Preferably, the depalletizer can use any end-of-arm tool appropriate for depalletizing. Any prehensile end effector can be used, including impactive, ingressive, astrictive, and contigutive. Impactive effectors include jaws or claws which physically grasp by direct impact upon the object. Ingressive effectors include pins, needles or hackles which physically penetrate the surface of the object (used in textile, carbon and glass fibre handling). Astrictive effectors are those that produce a binding force using a field, and include vacuum, magneto- or electroadhesion. Contigutive effectors requiring direct contact for adhesion to take place (such as glue, surface tension or freezing). In a preferred embodiment, side clamps are used to unload a layer. In one embodiment, the arm of the depalletizer can move up to approximately 100 kg (or approximately 220 lbs). In one embodiment, the depalletizer has a camera that is operable to view and/or detect that a pallet is twisted, shifted, or skewed, as well as the nature and degree of the twisting, shifting, and/or skewing. Preferably, the camera is top-mounted above the arm. In one embodiment, the depalletizer can handle up to about 8 inches of skew (i.e. a load being up to about 8 inches off of the pallet) before correction is needed. In one embodiment, the depalletizer includes an assembly for correcting the twisting, shifting, and/or skewing.

In one embodiment, the depalletizer does not include panels.

Figure 27:
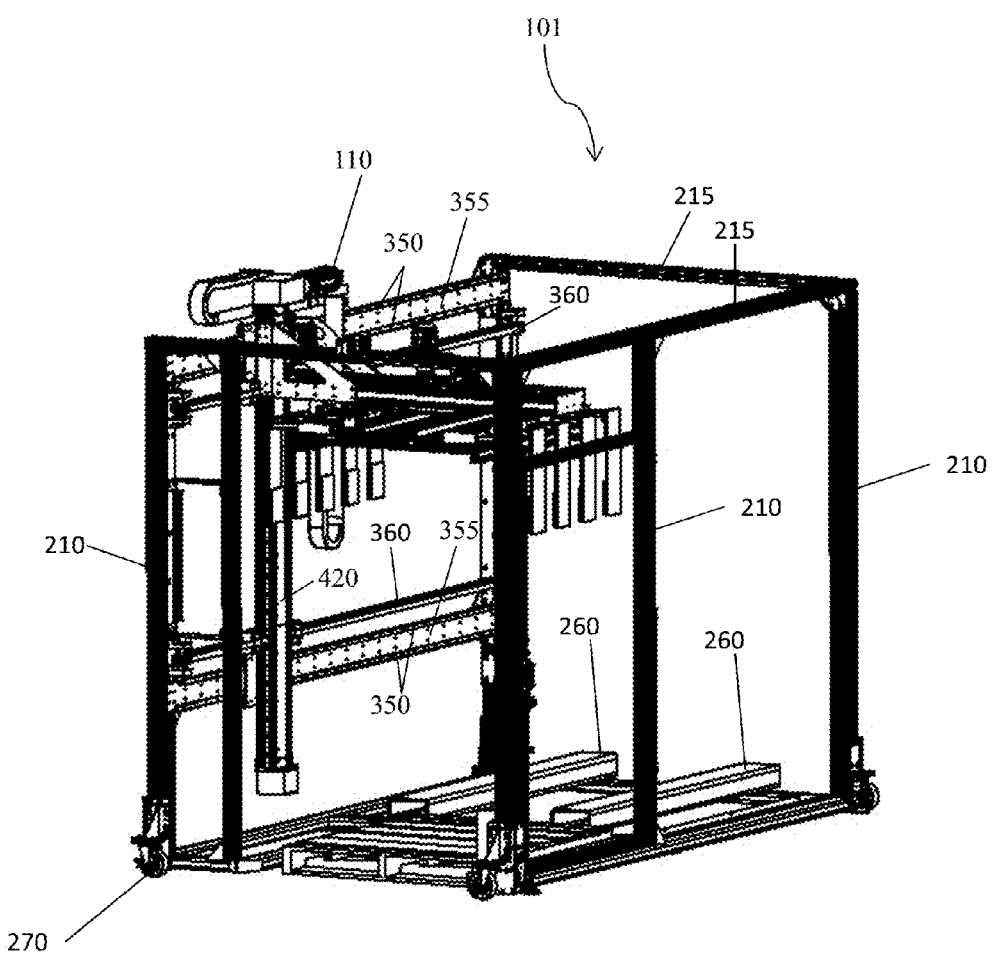
FIG. 27 illustrates a perspective front view of a depalletizer without panels according to the present invention.

FIG. 27 illustrates a perspective front view of a depalletizer 101 without panels according to the present invention, showing a motor 110, vertical posts of the frame 210, horizontal bars of the frame 215, forklift pockets 260, wheels 270, v-rails 350, plates for mounting v-rails 355, timing belts 360, and a spine 420.

Figure 28:
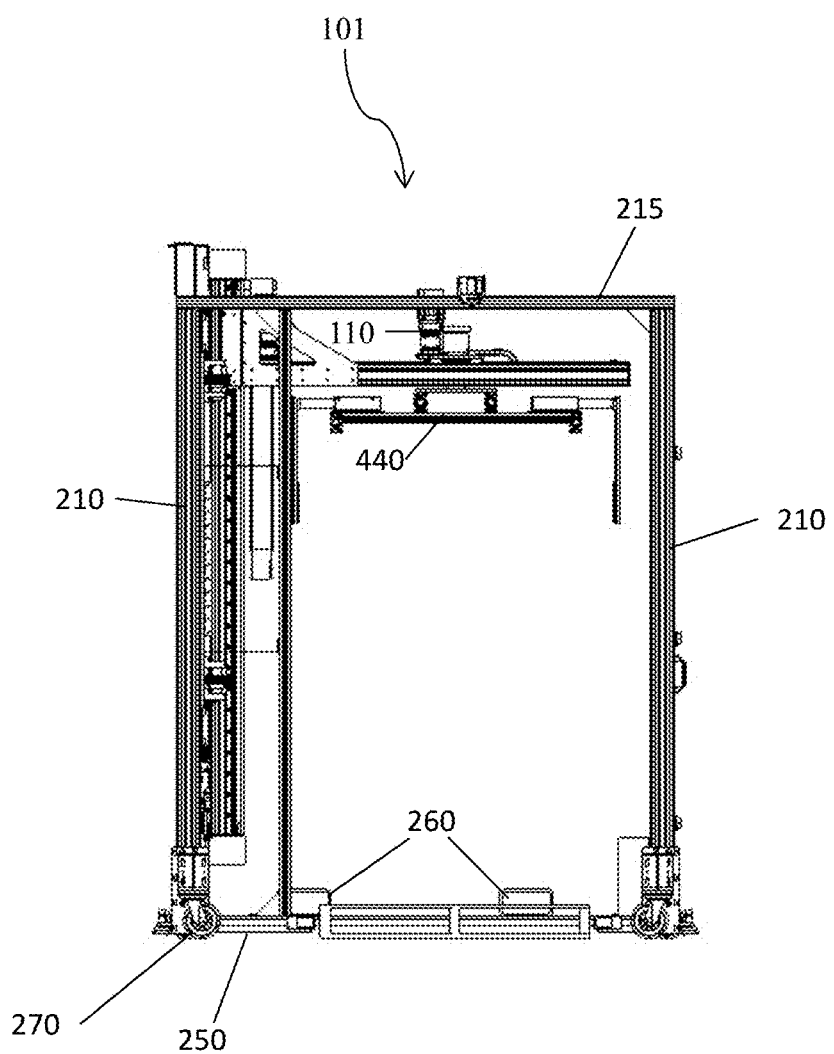
FIG. 28 illustrates a front view of a depalletizer without panels according to the present invention.

FIG. 28 illustrates a front view of a depalletizer 101 without panels according to the present invention and shows a motor 110, vertical posts of the frame 210, horizontal bars of the frame 215, a steel base 250, forklift pockets 260, wheels 270, and an end of arm tooling (EOAT) assembly 440.

Figure 29:
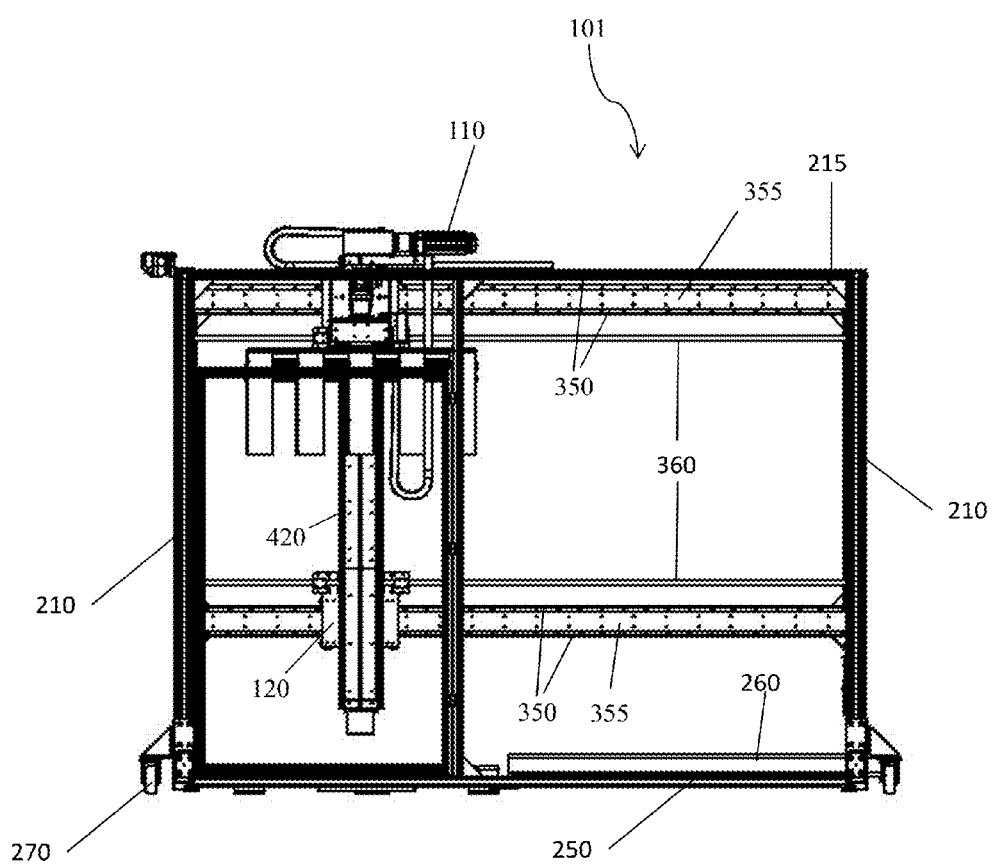
FIG. 29 illustrates a side view of a depalletizer without panels according to the present invention.

FIG. 29 illustrates a side view of a depalletizer 101 without panels according to the present invention, showing a motor 110, v-roller mount and belt tensioner 120, vertical posts of the frame 210, horizontal bars of the frame 215, a steel base 250, forklift pockets 260, wheels 270, v-rails 350, plates for mounting v-rails 355, timing belts 360, and a spine 420.

Figure 30:
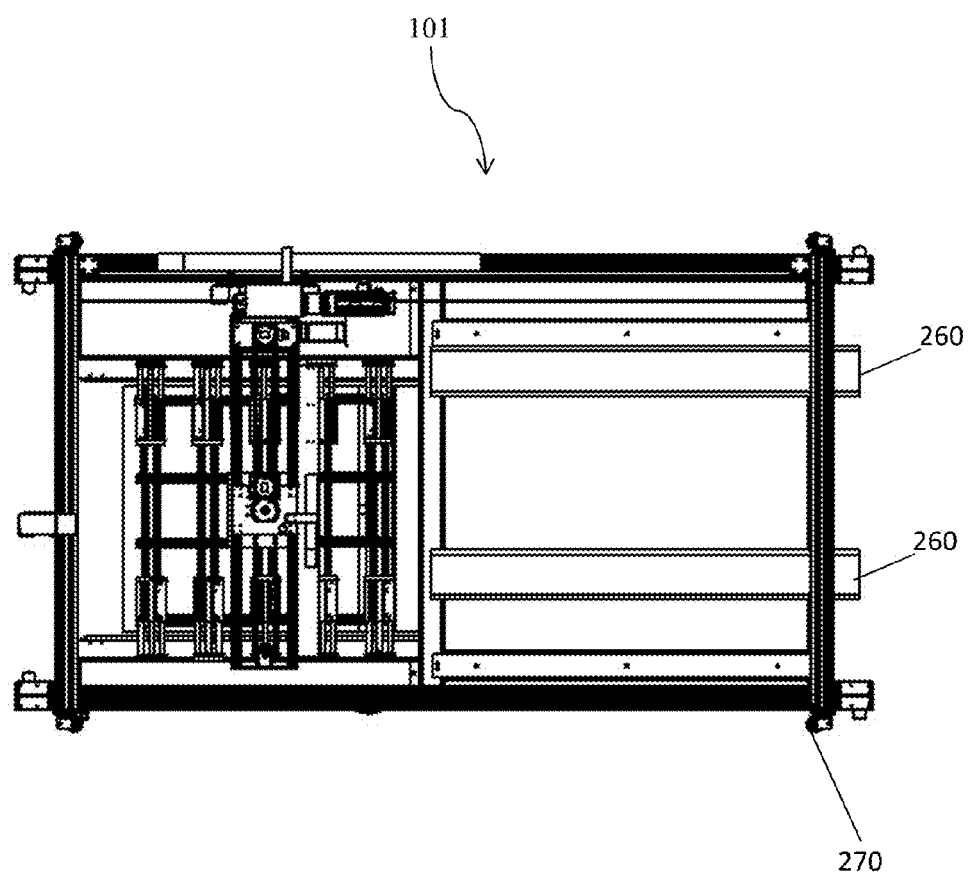
FIG. 30 illustrates a top view of a depalletizer according to the present invention.

FIG. 30 illustrates a top view of a depalletizer 101 according to the present invention, showing forklift pockets 260 and wheels 270.

In another embodiment, the depalletizer includes panels. Preferably, the panels are constructed of aluminum and/or polycarbonate. The aluminum panels add strength, rigidity, and stiffness to the structure, and the polycarbonate panels add visibility as well as creating a safe enclosure. The panels provide security and safety by partially enclosing the compact palletizer. In one embodiment, the panels become an integral part of the assembly, thus adding even more rigidity to the already rigid palletizer.

In one embodiment, the depalletizer also includes clear polycarbonate panels and/or clear polycarbonate doors. The polycarbonate panels and/or polycarbonate doors are operable to make the interior of the palletizer accessible, as well as to provide visibility into the interior of the palletizer.

Figure 31:
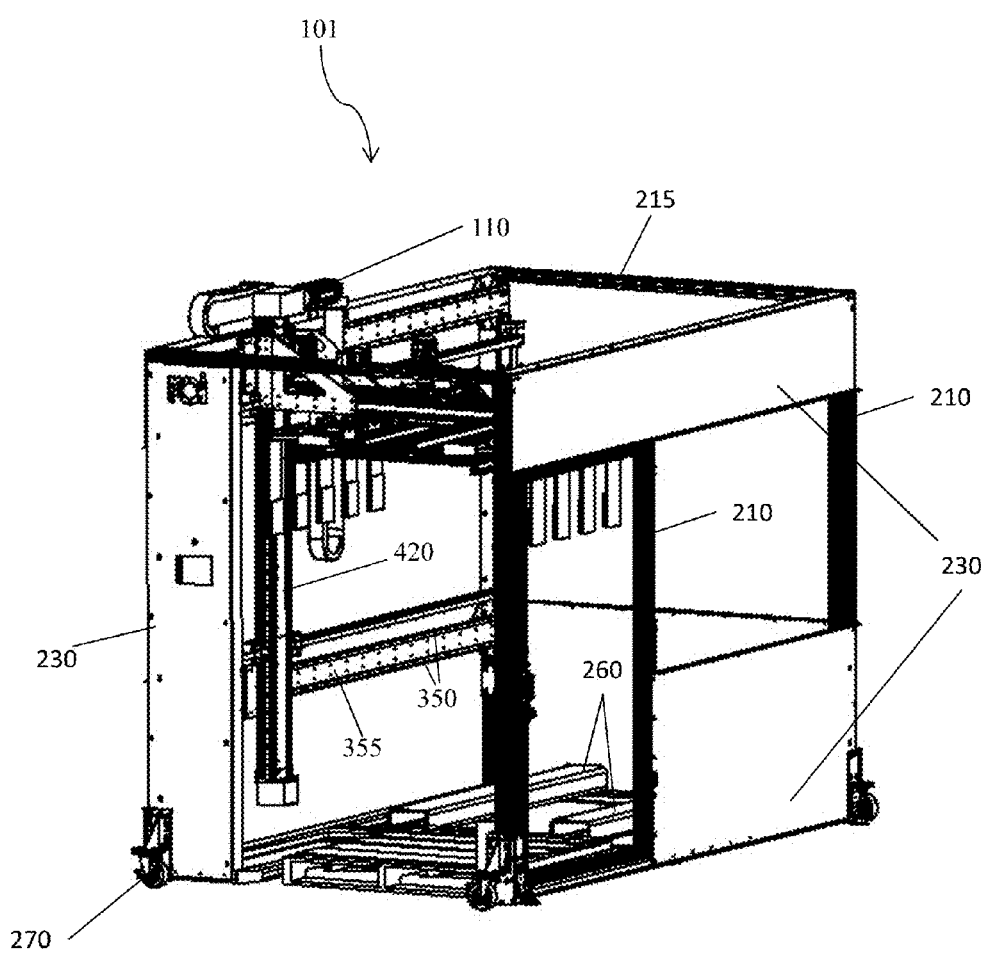
FIG. 31 illustrates a perspective front view of a depalletizer with panels according to the present invention.

FIG. 31 illustrates a perspective front view of a depalletizer 101 with panels according to the present invention, showing a motor, vertical posts of the frame 210, horizontal bars of the frame 215, panels 230, forklift pockets 260, wheels 270, v-rails 350, plates for mounting v-rails 355, and a spine 420.

The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A compact depalletizer comprising:
   a skeleton including a base, a frame, and an x-axis structure; and
   an assembly including an x-axis subassembly, a z-axis subassembly, and a y-axis subassembly,
   wherein the frame includes a multiplicity of vertical posts and a multiplicity of horizontal bars;
   wherein the x-axis structure includes two horizontal support beams rigidly fixed between two vertical end plates;
   wherein the x-axis subassembly is affixed to the x-axis structure, and the x-axis subassembly provides an interface for mounting at least two z-axis mounts of the z-axis subassembly to the x-axis subassembly, wherein the at least two z-axis mounts provide for horizontal movement of the z-axis subassembly;
   wherein the z-axis subassembly includes a chassis subassembly and a spine, wherein the chassis subassembly is operable to move vertically along the spine and wherein the y-axis subassembly is attached to the z-axis subassembly via the chassis subassembly;
   wherein the y-axis subassembly includes an arm, wherein linear rails are mounted to the top of the arm;
   wherein the compact depalletizer further includes a plurality of panels affixed to the multiplicity of vertical posts and/or the multiplicity of horizontal bars, wherein the plurality of panels is comprised of polycarbonate and/or aluminum; and
   wherein during assembly of the compact depalletizer, the multiplicity of vertical posts are affixed to the base between about 1 degree and about 2 degrees from a plane vertically perpendicular to the base, such that when the multiplicity of horizontal bars are affixed to the multiplicity of vertical posts, the multiplicity of vertical posts become oriented vertically perpendicular to the base and the multiplicity of vertical posts and the multiplicity of horizontal bars are pretensioned or prestressed by the vertically perpendicular orientation of the vertical posts.

2. The compact depalletizer of claim 1, wherein the multiplicity of vertical posts, the multiplicity of horizontal bars, the two horizontal support beams, and the two vertical end plates are constructed of extruded aluminum profile, and wherein the spine includes extruded aluminum profile components.

3. The compact depalletizer of claim 1, wherein neither the y-axis subassembly, the z-axis subassembly, nor the x-axis subassembly are mounted from the top of the compact depalletizer or from the multiplicity of horizontal bars.

4. The compact depalletizer of claim 1, further comprising a theta-axis subassembly, wherein the theta-axis subassembly is mounted on bearing blocks of the y-axis subassembly, and wherein the theta-axis subassembly includes an end of arm tooling (EOAT) subassembly.

5. The compact depalletizer of claim 1, further comprising robotic elements, wherein the robotic elements are preprogrammed such that the compact depalletizer does not require reprogramming after transport or assembly.

6. A compact depalletizer comprising:
a skeleton including a base, a frame, and an x-axis structure; and
an assembly including an x-axis subassembly, a z-axis subassembly, a y-axis subassembly, and a theta-axis subassembly;
wherein the frame includes a multiplicity of vertical posts;
wherein the x-axis structure includes two horizontal support beams rigidly fixed between two vertical end plates, and two plates for mounting rails, wherein the two plates are parallel to the two horizontal support beams;
wherein the x-axis subassembly includes two sets of rails, wherein the two sets of rails are affixed to the two plates;
wherein the two sets of rails are connected to roller mounts such that each set of the two sets of rails is connected to one roller mount, wherein the roller mounts provide for horizontal movement of the z-axis subassembly via the two sets of rails and the roller mounts;
wherein the z-axis subassembly includes a spine, wherein the spine includes two structural components, wherein the z-axis subassembly further includes a chassis subassembly, wherein the chassis subassembly is operable to move vertically along the spine, wherein one end of the y-axis subassembly is attached to the z-axis subassembly via the chassis subassembly;
wherein the y-axis subassembly includes an arm comprised of two spaced apart structural arm components, wherein two linear rails are mounted to the top of the two spaced apart structural arm components so that they are parallel to the two spaced apart structural arm components, wherein the y-axis subassembly further includes bearing blocks for mounting the theta-axis subassembly; and
wherein the theta-axis subassembly includes an end of arm tooling (EOAT) subassembly.

7. The compact depalletizer of claim 6, further comprising a plurality of panels comprised of polycarbonate and/or aluminum, wherein the plurality of panels is affixed to the multiplicity of vertical posts.

8. The compact depalletizer of claim 6, further comprising robotic elements, wherein the robotic elements are preprogrammed such that the compact depalletizer does not require reprogramming after transport or assembly.

9. The compact depalletizer of claim 6, wherein the frame, the x-axis structure, and the assembly do not include welded components.

10. The compact depalletizer of claim 6, wherein the multiplicity of vertical posts and the two horizontal support beams are pretensioned or prestressed.

11. The compact depalletizer of claim 6, wherein the frame further comprises a multiplicity of horizontal bars affixed to the multiplicity of vertical posts, and wherein during assembly of the compact depalletizer, the multiplicity of vertical posts are affixed to the base between about 1 degree and about 2 degrees from a plane vertically perpendicular to the base, such that when the multiplicity of horizontal bars are affixed to the multiplicity of vertical posts, the multiplicity of vertical posts become oriented vertically perpendicular to the base and the multiplicity of vertical posts and the multiplicity of horizontal bars are pretensioned or prestressed by the vertically perpendicular orientation of the vertical posts.

12. The compact depalletizer of claim 11, wherein the two horizontal support beams are rigidly fixed between the two vertical end plates, wherein the two sets of rails are affixed to the two plates, and the multiplicity of horizontal bars are affixed to the multiplicity of vertical posts.

13. The compact depalletizer of claim 6, wherein the end of the y-axis subassembly which is not attached to the chassis subassembly is operable to flex between about 0 millimeters and about 3.175 millimeters from a plane horizontally perpendicular to the x-axis subassembly.

14. A compact depalletizer comprising:
a skeleton including a base and a frame; and
an assembly,
wherein the frame includes a multiplicity of vertical posts and a multiplicity of horizontal bars;
wherein the assembly includes an arm with an end of arm tooling (EOAT) subassembly for moving at least one object; and
wherein during assembly of the compact depalletizer, the multiplicity of vertical posts are affixed to the base between about 1 degree and about 2 degrees from a plane vertically perpendicular to the base, such that when the multiplicity of horizontal bars are affixed to the multiplicity of vertical posts, the multiplicity of vertical posts become oriented vertically perpendicular to the base and the multiplicity of vertical posts and the multiplicity of horizontal bars are pretensioned or prestressed by the vertically perpendicular orientation of the vertical posts.

15. The compact depalletizer of claim 14, further comprising robotic elements, wherein the robotic elements are preprogrammed such that the compact depalletizer does not require reprogramming after transport or assembly.

16. The compact depalletizer of claim 14, wherein the frame and the assembly do not include welded components.

17. The compact depalletizer of claim 14, further comprising a plurality of panels affixed to the multiplicity of vertical posts and/or the multiplicity of horizontal bars.

* * * * *